US012431067B2

(12) United States Patent
Kim et al.

(10) Patent No.: US 12,431,067 B2
(45) Date of Patent: Sep. 30, 2025

(54) SUB-PIXEL HAVING A REDUCED AREA BY MINIMIZING COMPONENTS AND DISPLAY DEVICE HAVING THE SAME

(71) Applicant: Samsung Display Co., LTD., Yongin-si (KR)

(72) Inventors: Kwi Hyun Kim, Yongin-si (KR); Yeon Kyung Kim, Yongin-si (KR); Dong Woo Kim, Yongin-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/427,833

(22) Filed: Jan. 31, 2024

(65) Prior Publication Data

US 2024/0355268 A1 Oct. 24, 2024

(30) Foreign Application Priority Data

Apr. 20, 2023 (KR) ........................ 10-2023-0052217

(51) Int. Cl.
*G09G 3/32* (2016.01)

(52) U.S. Cl.
CPC ....... *G09G 3/32* (2013.01); *G09G 2300/0819* (2013.01); *G09G 2300/0852* (2013.01); *G09G 2300/0861* (2013.01); *G09G 2310/08* (2013.01); *G09G 2320/045* (2013.01)

(58) Field of Classification Search
CPC ............. G09G 3/32; G09G 2300/0819; G09G 2300/0852; G09G 2300/0861; G09G 2310/08; G09G 2320/045
See application file for complete search history.

(56) References Cited

U.S. PATENT DOCUMENTS

| | | | | |
|---|---|---|---|---|
| 10,621,920 | B2 | 4/2020 | Gao et al. | |
| 11,158,250 | B2 | 10/2021 | Xiao et al. | |
| 11,361,711 | B2 | 6/2022 | Dong | |
| 2019/0304364 | A1* | 10/2019 | Xiao | G09G 3/3233 |
| 2020/0051505 | A1 | 2/2020 | Toyomura et al. | |
| 2022/0328010 | A1* | 10/2022 | Wang | G09G 3/3233 |

FOREIGN PATENT DOCUMENTS

| | | |
|---|---|---|
| CN | 108492770 | 9/2018 |
| CN | 112509518 | 3/2021 |
| CN | 115035845 | 9/2022 |
| CN | 115188333 | 10/2022 |

* cited by examiner

*Primary Examiner* — Afroza Chowdhury
(74) *Attorney, Agent, or Firm* — Harness, Dickey & Pierce, P.L.C.

(57) ABSTRACT

A sub-pixel includes a light emitting element, a first transistor that applies a driving current to the light emitting element, a second transistor that writes a data voltage in response to a write gate signal, a first capacitor electrically connected to a control electrode of the first transistor, a second capacitor including a first electrode electrically connected to the second transistor and a second electrode electrically connected to the control electrode of the first transistor, a third transistor that diode-connects the first transistor in response to a compensation gate signal, a fourth transistor that applies a first initialization voltage to a first electrode of the third transistor in response to an initialization gate signal, and a fifth transistor that transfers the driving current to the light emitting element in response to an emission signal.

21 Claims, 20 Drawing Sheets

SUB-PIXEL HAVING A REDUCED AREA BY MINIMIZING COMPONENTS AND DISPLAY DEVICE HAVING THE SAME

CROSS-REFERENCE TO RELATED APPLICATIONS

This application claims priority under 35 U.S.C. § 119 from Korean Patent Application No. 10-2023-0052217 filed on Apr. 20, 2023 in the Korean Intellectual Property Office, the entire contents of which are incorporated herein by reference.

BACKGROUND

1. Technical Field

The disclosure generally relates to a sub-pixel and a display device having the same.

2. Description of the Related Art

In general, a display device includes a display panel, a gate driver, a data driver, and a driving controller. The display panel includes multiple gate lines, multiple data lines, and multiple sub-pixels electrically connected to the gate lines and the data lines. The gate driver provides gate signals to the gate lines, the data driver provides data voltages to the data lines, and the driving controller controls the gate driver and the data driver.

Recently, display devices which provide virtual reality (VR) or augmented reality (AR) have come into the spotlight. To this end, the display devices require small area and high pixels per inch (ppi). In order to achieve the small area and high ppi, components may be integrated in an area as narrow as possible in a display device. However, there may be a limitation in allowing some components having a minimum width for satisfying design rules in a design to be integrated in a narrow area.

SUMMARY

Embodiments may provide a sub-pixel configured with a small number of transistors.

Embodiments may also provide a sub-pixel with a plurality of transistors integrated into an area as narrow or as small as possible.

Embodiments also provide a display device having the sub-pixel.

In accordance with an aspect of the present disclosure, there is provided a sub-pixel that may include a light emitting element, a first transistor configured to apply a driving current to the light emitting element, a second transistor configured to write a data voltage in response to a write gate signal, a first capacitor electrically connected to a control electrode of the first transistor, a second capacitor including a first electrode electrically connected to the second transistor and a second electrode electrically connected to the control electrode of the first transistor, a third transistor to diode-connect the first transistor in response to a compensation gate signal, a fourth transistor configured to apply a first initialization voltage to a first electrode of the third transistor in response to an initialization gate signal, and a fifth transistor configured to transfer the driving current to the light emitting element in response to an emission signal.

The first transistor may further include a first electrode receiving a first power voltage, and a second electrode electrically connected to a second node. The control electrode of the first transistor may be electrically connected to a first node. The first capacitor may include a first electrode receiving the first power voltage and a second electrode electrically connected to the first node. The second transistor may include a control electrode receiving the write gate signal, a first electrode electrically connected to a data line receiving the data voltage, and a second electrode electrically connected to the first electrode of the second capacitor. The third transistor may include a control electrode receiving the compensation gate signal, the first electrode electrically connected to the second node, and a second electrode electrically connected to the first node. The fourth transistor may include a control electrode receiving the initialization gate signal, a first electrode receiving the first initialization voltage, and a second electrode electrically connected to the second node. The fifth transistor may include a control electrode receiving the emission signal, a first electrode electrically connected to the second node, and a second electrode electrically connected to a first electrode of the light emitting element. The light emitting element may further include a second electrode receiving a second power voltage.

The first to fifth transistors may be PMOS transistors.

The write gate signal, the initialization gate signal, the compensation gate signal, and the emission signal may have an activation period in an initialization period in which the first capacitor, the second capacitor, and the light emitting element may be initialized.

The second transistor may apply a reference voltage to the first electrode of the second capacitor in the initialization period.

After the emission signal is changed from an activation level to an inactivation level in the initialization period, the initialization gate signal may be changed from the activation level to the inactivation level.

The write gate signal, the initialization gate signal, and the emission signal may have an activation period in an initialization period in which the first capacitor, the second capacitor, and the light emitting element may be initialized.

The write gate signal and the compensation gate signal may have an activation period in a compensation period in which a threshold voltage of the first transistor may be compensated.

The second transistor may apply a reference voltage to the first electrode of the second capacitor in the compensation period.

The write gate signal may have an activation period in a data writing period in which the data voltage may be written.

The emission signal may have an activation period in an emission period in which the light emitting element may emit light.

The sub-pixel may further include a sixth transistor configured to apply the first initialization voltage to the control electrode of the first transistor in response to the initialization gate signal.

The sixth transistor may include a control electrode receiving the initialization gate signal, a first electrode receiving the first initialization voltage, and a second electrode electrically connected to the control electrode of the first transistor.

The sub-pixel may further include a sixth transistor configured to apply a second initialization voltage to the control electrode of the first transistor in response to the initialization gate signal.

In accordance with an aspect of the present disclosure, there may be provided a display device that may include a display panel including a sub-pixel, a data driver configured to provide a data voltage to the sub-pixel, a gate driver configured to provide a write gate signal, a compensation gate signal, and an initialization gate signal to the sub-pixel, an emission driver configured to provide an emission signal to the sub-pixel, and a driving controller configured to control the data driver, the gate driver, and the emission driver, wherein the sub-pixel may include a light emitting element, a first transistor configured to apply a driving current to the light emitting element, a second transistor configured to write a data voltage in response to the write gate signal, a first capacitor electrically connected to a control electrode of the first transistor, a second capacitor including a first electrode electrically connected to the second transistor and a second electrode electrically connected to the control electrode of the first transistor, a third transistor to diode-connect the first transistor in response to the compensation gate signal, a fourth transistor configured to apply a first initialization voltage to a first electrode of the third transistor in response to the initialization gate signal, and a fifth transistor configured to transfer the driving current to the light emitting element in response to the emission signal.

The first transistor may further include a first electrode receiving a first power voltage, and a second electrode electrically connected to a second node. The control electrode of the first transistor may be electrically connected to a first node. The first capacitor may include a first electrode receiving the first power voltage and a second electrode electrically connected to the first node. The second transistor may include a control electrode receiving the write gate signal, a first electrode electrically connected to a data line receiving the data voltage, and a second electrode electrically connected to the first electrode of the second capacitor. The third transistor may include a control electrode receiving the compensation gate signal, the first electrode electrically connected to the second node, and a second electrode electrically connected to the first node. The fourth transistor may include a control electrode receiving the initialization gate signal, a first electrode receiving the first initialization voltage, and a second electrode electrically connected to the second node. The fifth transistor may include a control electrode receiving the emission signal, a first electrode electrically connected to the second node, and a second electrode electrically connected to a first electrode of the light emitting element. The light emitting element may further include a second electrode receiving a second power voltage.

The write gate signal, the initialization gate signal, the compensation gate signal, and the emission signal may have an activation period in an initialization period in which the first capacitor, the second capacitor, and the light emitting element may be initialized.

The second transistor may apply a reference voltage to the first electrode of the second capacitor in the initialization period.

After the emission signal is changed from an activation level to an inactivation level in the initialization period, the initialization gate signal may be changed from the activation level to the inactivation level.

The sub-pixel may further include a sixth transistor configured to apply the first initialization voltage to the control electrode of the first transistor in response to the initialization gate signal.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
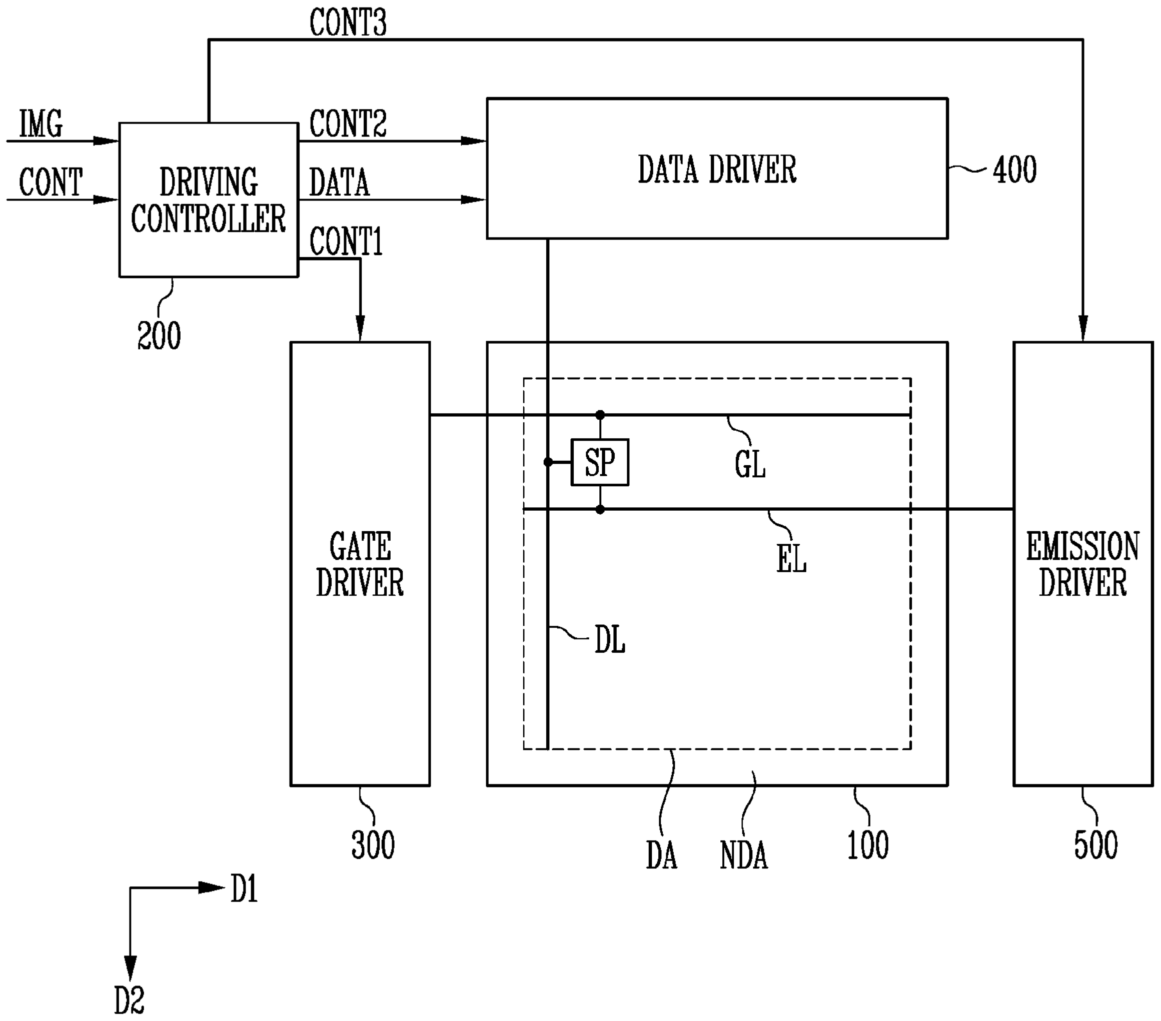
FIG. 1 is a schematic block diagram illustrating a display device in accordance with embodiments of the present disclosure.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in an embodiment.

Unless otherwise specified, the illustrated embodiments are to be understood as providing features of the disclosure. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The term "connected" may refer to physical, electrical, and/or fluid connection, with or without intervening elements. Also, when an element is referred to as being "in contact" or "contacted" or the like to another element, the element may be in "electrical contact" or in "physical contact" with another element; or in "indirect contact" or in "direct contact" with another element. Further, the X-axis, the Y-axis, and the Z-axis may not be limited to three axes of a rectangular coordinate system, such as the x, y, and z axes, and may be interpreted in a broader sense. For example, the X-axis, the Y-axis, and the Z-axis may be perpendicular to one another, or may be different directions that may not be perpendicular to one another.

As used herein, the term "and/or" includes any and all combinations of one or more of the associated listed items. A description that a component is "configured to" perform a specified operation may be defined as a case where the component is constructed and arranged with structural features that can cause the component to perform the specified operation.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be disposed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, portion, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

FIG. 1 is a schematic block diagram illustrating a display device in accordance with embodiments of the disclosure. Referring to FIG. 1, the display device may include a display panel 100, a driving controller 200, a gate driver 300, a data driver 400, and an emission driver 500. In an embodiment, the driving controller 200 and the data driver 400 may be integrated into one chip.

The display panel 100 may include a display area DA in which an image may be displayed and a non-display area NDA disposed adjacent to the display area DA. In an embodiment, the gate driver 300 and the emission driver 500 may be mounted in the non-display area NDA.

The display panel 100 may include multiple gate lines GL, multiple data lines DL, multiple emission lines EL, and multiple sub-pixels SP electrically connected to the gate lines GL, the data lines DL, and the emission lines EL. The gate lines GL and the emission lines EL may extend in a first direction D1, and the data lines DL may extend in a second direction D2 intersecting the first direction D1.

The driving controller 200 may receive input image data IMG and an input control signal CONT from a main processor (e.g., a graphic processing unit (GPU) or the like). For example, the input image data IMG may include red image data, green image data, and blue image data. In an embodiment, the input image data IMG may further include white image data. In an embodiment, the input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, and a data signal DATA based on the input image data IMG and the input control signal CONT. The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 400 based on the input control signal CONT and output the second control signal CONT2 to the data driver 400. The second control signal CONT2 may include a horizontal start signal and a load signal.

The driving controller 200 may generate the data signal DATA by receiving the input image data IMG and the input control signal CONT. The driving controller 200 may output the data signal DATA to the data driver 400.

The driving controller 200 may generate the third control signal CONT3 for controlling an operation of the emission driver 500 based on the input control signal CONT and output the third control signal CONT3 to the emission driver 500. The third control signal CONT3 may include a vertical start signal and an emission clock signal.

The gate driver 300 may generate gate signals (e.g., write gate signals GW, initialization gate signals GR and compensation gate signals GC shown in FIGS. 2-12) for driving the gate lines GL in response to the first control signal CONT1 input from the driving controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the driving controller 200. The data driver 400 may generate data voltages (VDATA shown in FIG. 3) obtained by converting the data signal DATA into a voltage in an analog form. The data driver 400 may output the data voltages VDATA to the data lines DL.

The emission driver 500 may generate emission signals (EM shown in FIG. 2) for driving the emission lines EL in response to the third control signal CONT3 input from the driving controller 200. The emission driver 500 may output the emission signals to the emission lines EL. For example, the emission driver 500 may sequentially output the emission signals EM to the emission lines EL.

Figure 2:
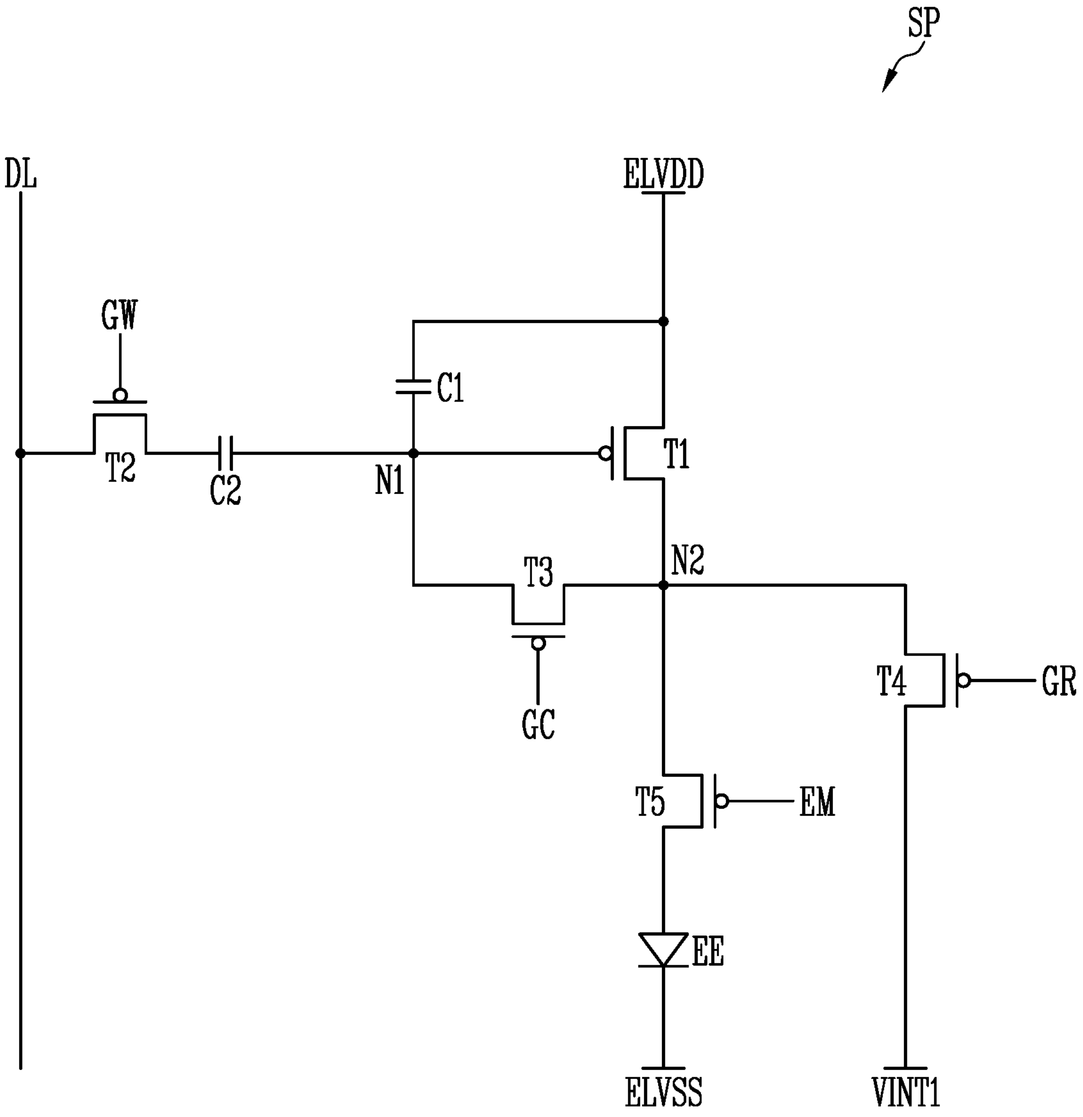
FIG. 2 is a schematic diagram of an equivalent circuit of a sub-pixel shown in FIG. 1.
Figure 3:
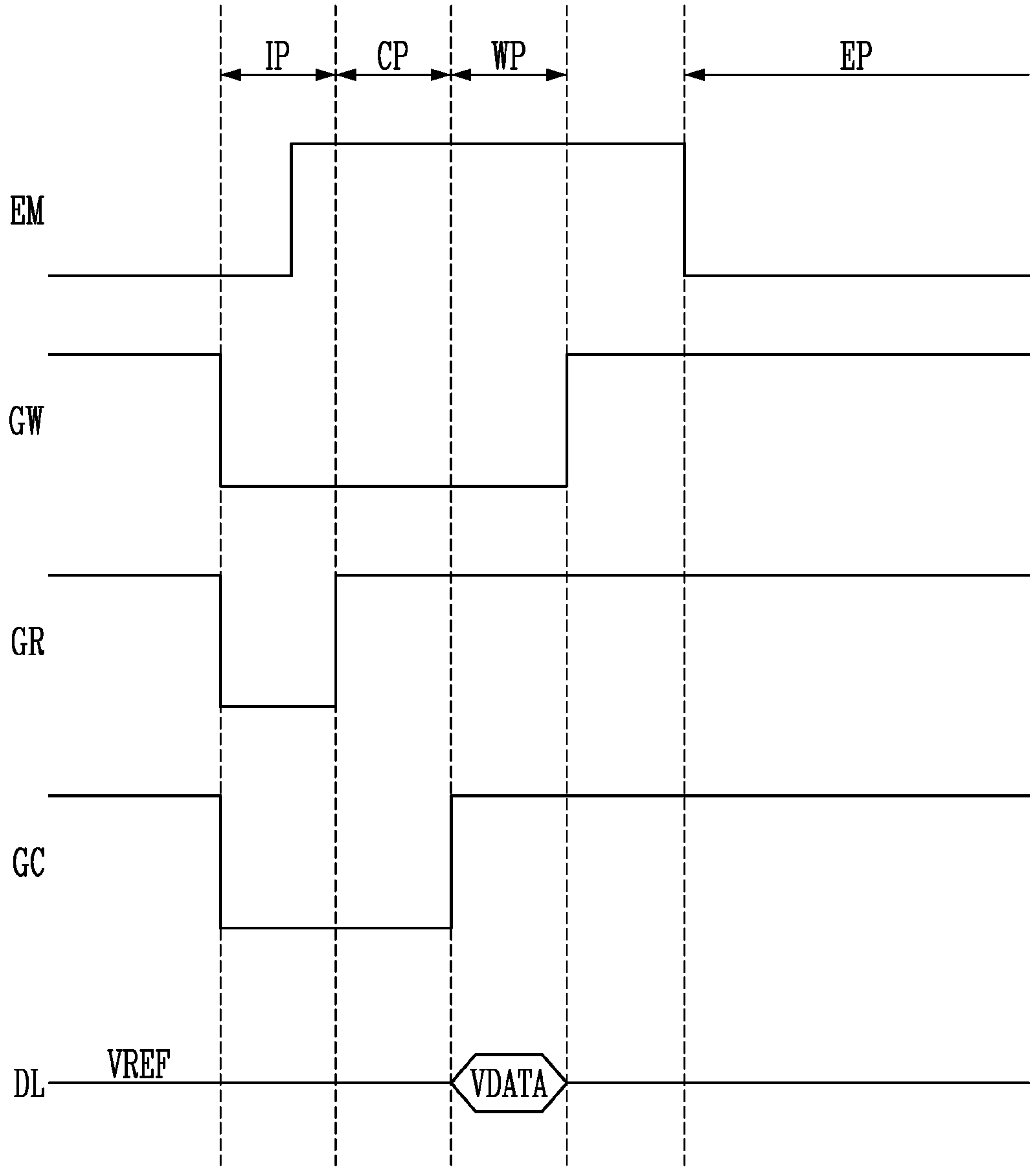
FIG. 3 is a schematic timing diagram illustrating an example in which the sub-pixel shown in FIG. 1 is driven.

FIG. 2 is a schematic diagram of an equivalent circuit of the sub-pixel SP shown in FIG. 1, and FIG. 3 is a schematic timing diagram illustrating an example in which the sub-pixel SP shown in FIG. 1 may be driven. Referring to FIGS. 2 and 3, the sub-pixel SP may include a light emitting element EE, a first transistor T1 for applying a driving current (ID shown in FIG. 7A) to the light emitting element EE, a second transistor T2 for writing a data voltage VDATA in response to a write gate signal GW, a first capacitor C1 electrically connected to a control electrode of the first transistor T1, a second capacitor C2 including a first electrode electrically connected to the second transistor T2 and a second electrode electrically connected to the control electrode of the first transistor T1, a third transistor T3 for diode-connecting the first transistor T1 in response to a compensation gate signal GC, a fourth transistor T4 for applying a first initialization voltage VINT1 to a first electrode of the third transistor T3 in response to an initialization gate signal GR, and a fifth transistor T5 for transferring the driving current (ID shown in FIG. 7A) to the light emitting element EE in response to an emission signal EM.

For example, the first transistor T1 may include the control electrode electrically connected to a first node N1, a first electrode receiving a first power voltage ELVDD (e.g., a high power voltage), and a second electrode electrically connected to the second node N2. The first capacitor C1 may include a first electrode receiving the first power voltage ELVDD and a second electrode electrically connected to the first node N1. The second transistor T2 may include a control electrode receiving the write gate signal GW, a first electrode electrically connected to a data line DL receiving the data voltage VDATA, and a second electrode electrically connected to a first electrode of the second capacitor C2. The second capacitor C2 may include the first electrode electrically connected to the second electrode of the second transistor T2 and a second electrode electrically connected to the first node N1. The third transistor T3 may include a control electrode receiving the compensation gate signal GC, the first electrode electrically connected to the second node N2, and a second electrode electrically connected to the first node N1. The fourth transistor T4 may include a control electrode receiving an initialization gate signal GR, a first electrode receiving the first initialization voltage VINT1, and a second electrode electrically connected to the second node N2. The fifth transistor T5 may include a control electrode receiving the emission signal EM, a first electrode electrically connected to the second node N2, and a second electrode electrically connected to a first electrode of the light emitting element EE. The light emitting element EE may include the first electrode electrically connected to the second electrode of the fifth transistor T5 and a second electrode receiving a second power voltage ELVES (e.g., a low power voltage).

The first to fifth transistors T1, T2, T3, T4, and T5 may be implemented with a p-channel metal oxide semiconductor (PMOS) transistor. A low voltage level may be an activation level, and a high voltage level may be an inactivation level. For example, in case that a signal applied to a control electrode of the PMOS transistor has the low voltage level, the PMOS transistor may be turned on. For example, in case that a signal applied to the control electrode of the PMOS transistor has the high voltage level, the PMOS transistor may be turned off.

In case that the display device may be used as a display screen of a virtual reality device, an augmented reality device, or the like, the display device may be located very close to eyes of a user. In case that the display device may be used as a display screen of a virtual reality device, an augmented reality device, or the like, the degree of integration of sub-pixels SP may be high. In one method for increasing the degree of integration of sub-pixels SP, the sub-pixels SP may be formed on a silicon substrate. A technique for forming a light emitting element and transistors on a silicon substrate may be designated as OLED on Silicon (OLEDoS). The display panel 100 having a high degree of integration may be designated as a micro OLED or a micro display.

However, the disclosure may not be limited thereto. For example, the first to fifth transistors T1, T2, T3, T4, and T5 may instead be implemented with an n-channel metal oxide semiconductor (NMOS) transistor.

Figure 4A:
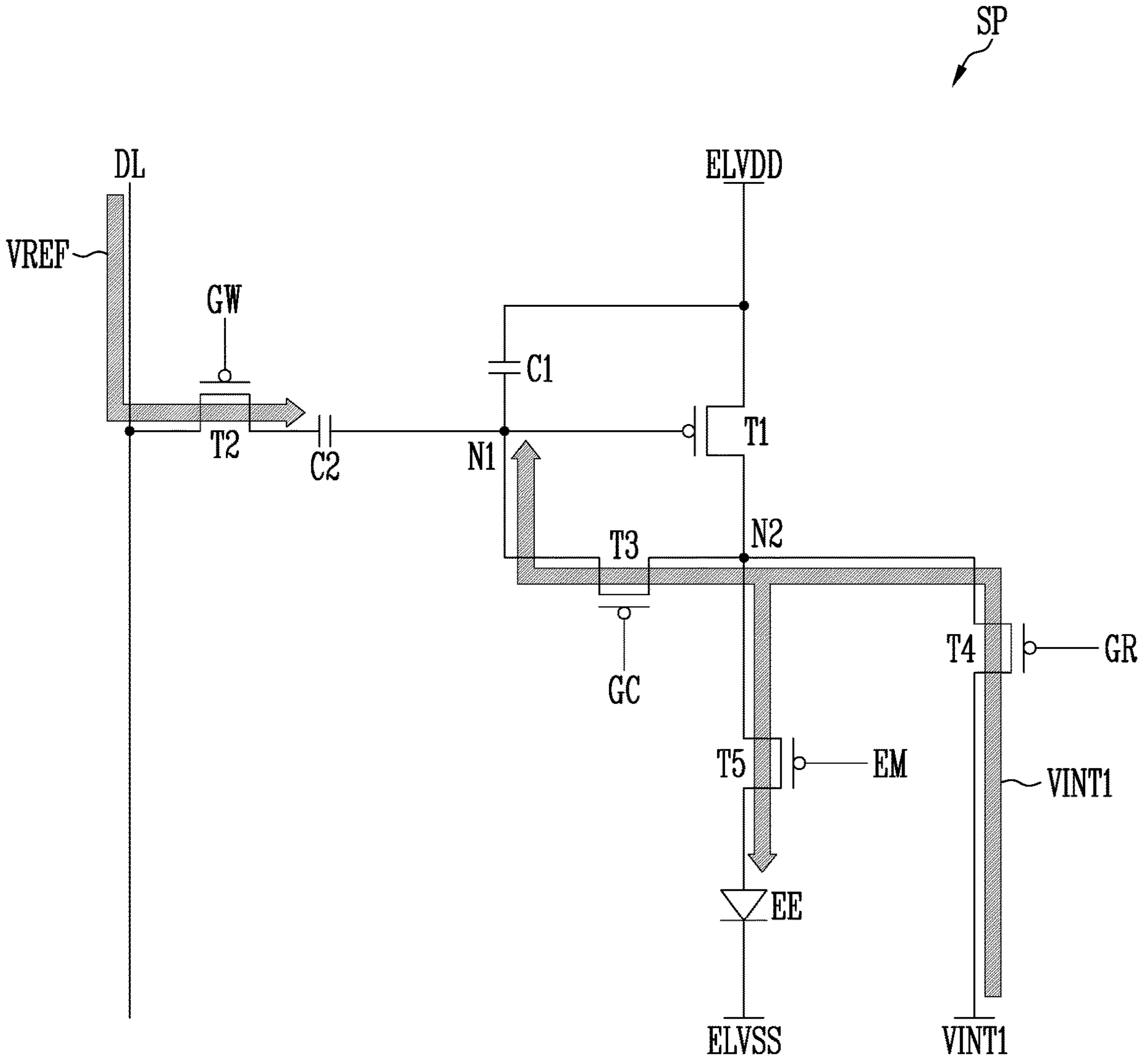
FIGS. 4A and 4B are schematic diagrams illustrating an example in which the sub-pixel shown in FIG. 1 is driven in an initialization period.
Figure 4B:
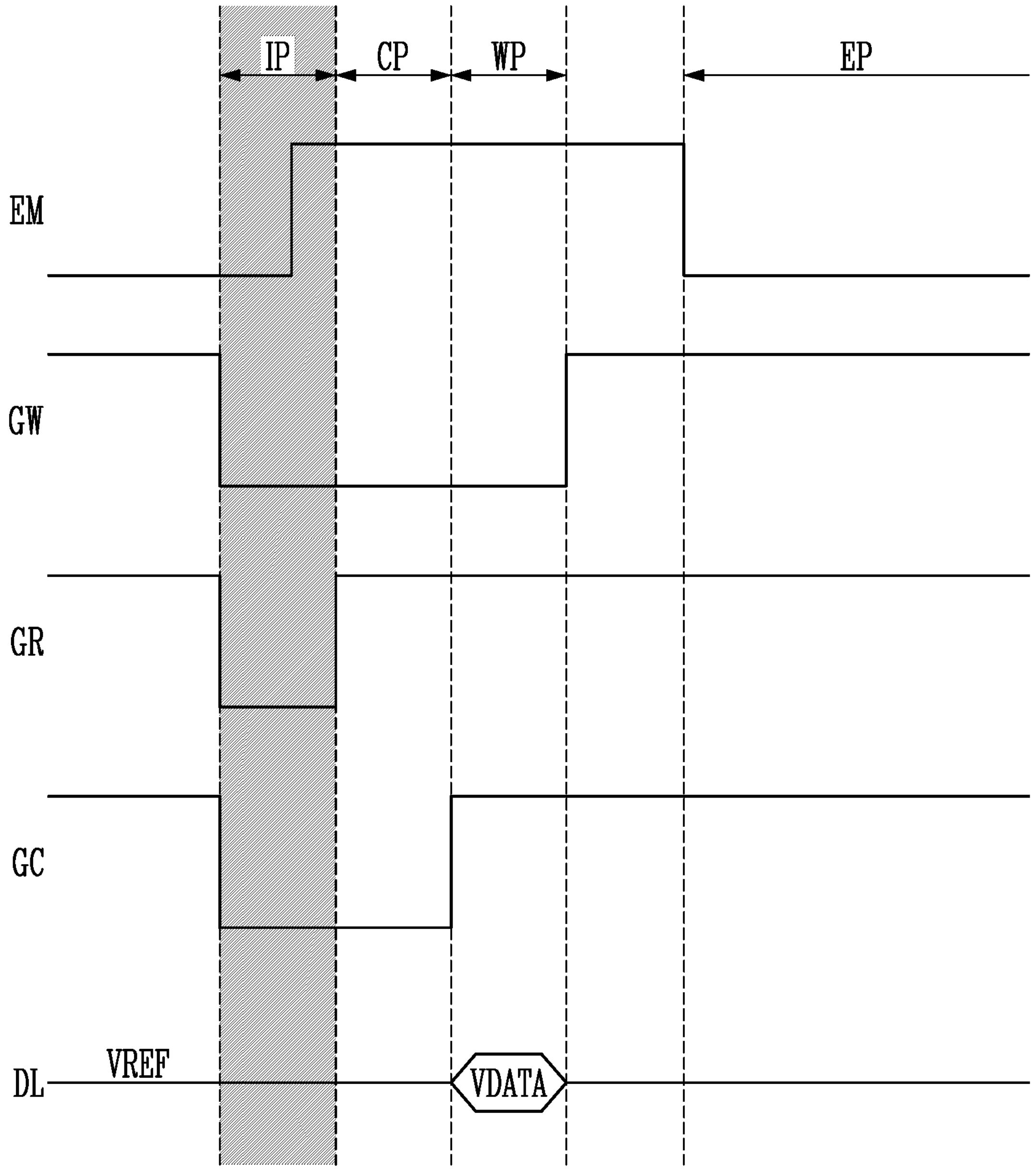

FIGS. 4A and 4B are schematic diagrams illustrating an example in which the sub-pixel SP shown in FIG. 1 may be driven in an initialization period IP. Referring to FIGS. 4A and 4B, the write gate signal GW, the initialization gate signal GR, the compensation gate signal GC, and the emission signal EM may have an activation period in an initialization period IP in which the first capacitor C1, the second capacitor C2, and the light emitting element EE may be initialized. The second transistor T2 may apply a reference voltage VREF to the first electrode of the second capacitor C2 in the initialization period IP. The activation period may be a period having the activation level.

For example, in the initialization period IP, the write gate signal GW, the initialization gate signal GR, the compensation gate signal GC, and the emission signal EM may have the activation level, and the second to fifth transistors T2, T3, T4, and T5 may be turned on. Accordingly, the reference voltage VREF may be applied to the first electrode of the second capacitor C2, and the first initialization voltage VINT1 may be applied to the second electrode of the second capacitor C2, the second electrode of the first capacitor C1, and the first electrode of the light emitting element EE. As a result, the first capacitor C1, the second capacitor C2, and the light emitting element EE may be initialized.

In an embodiment, after the emission signal EM is changed from the activation level to the inactivation level in the initialization period IP, the initialization gate signal GR may be changed from the activation level to the inactivation level. For example, in a first portion of the initialization period IP, the write gate signal GW, the initialization gate signal GR, the compensation gate signal GC, and the emission signal EM may have the activation level. In a second portion subsequent to the first portion of the initialization period IP, the write gate signal GW, the initialization gate signal GR, and the compensation gate signal GC may still have the activation level, but the emission signal EM may have the inactivation level.

Accordingly, the first capacitor C1, the second capacitor C2, and the light emitting element EE can be more stably initialized. For example, in case that the initialization gate signal GR is changed to the inactivation level earlier than the emission signal EM, a voltage of the second electrode of the first transistor T1 may increase, and a black luminance may increase.

Figure 5A:
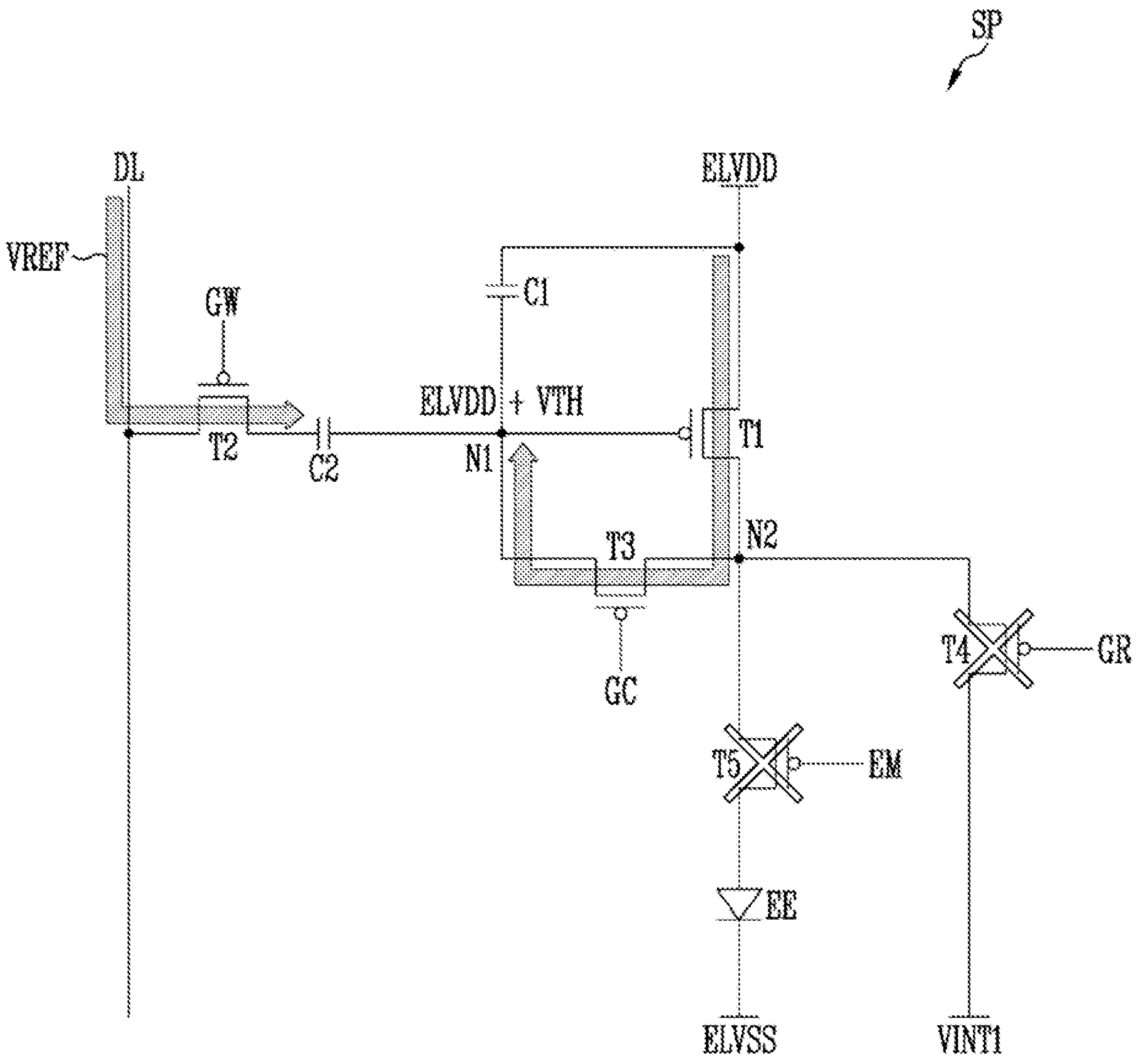
FIGS. 5A and 5B are schematic diagrams illustrating an example in which the sub-pixel shown in FIG. 1 is driven in a compensation period.
Figure 5B:
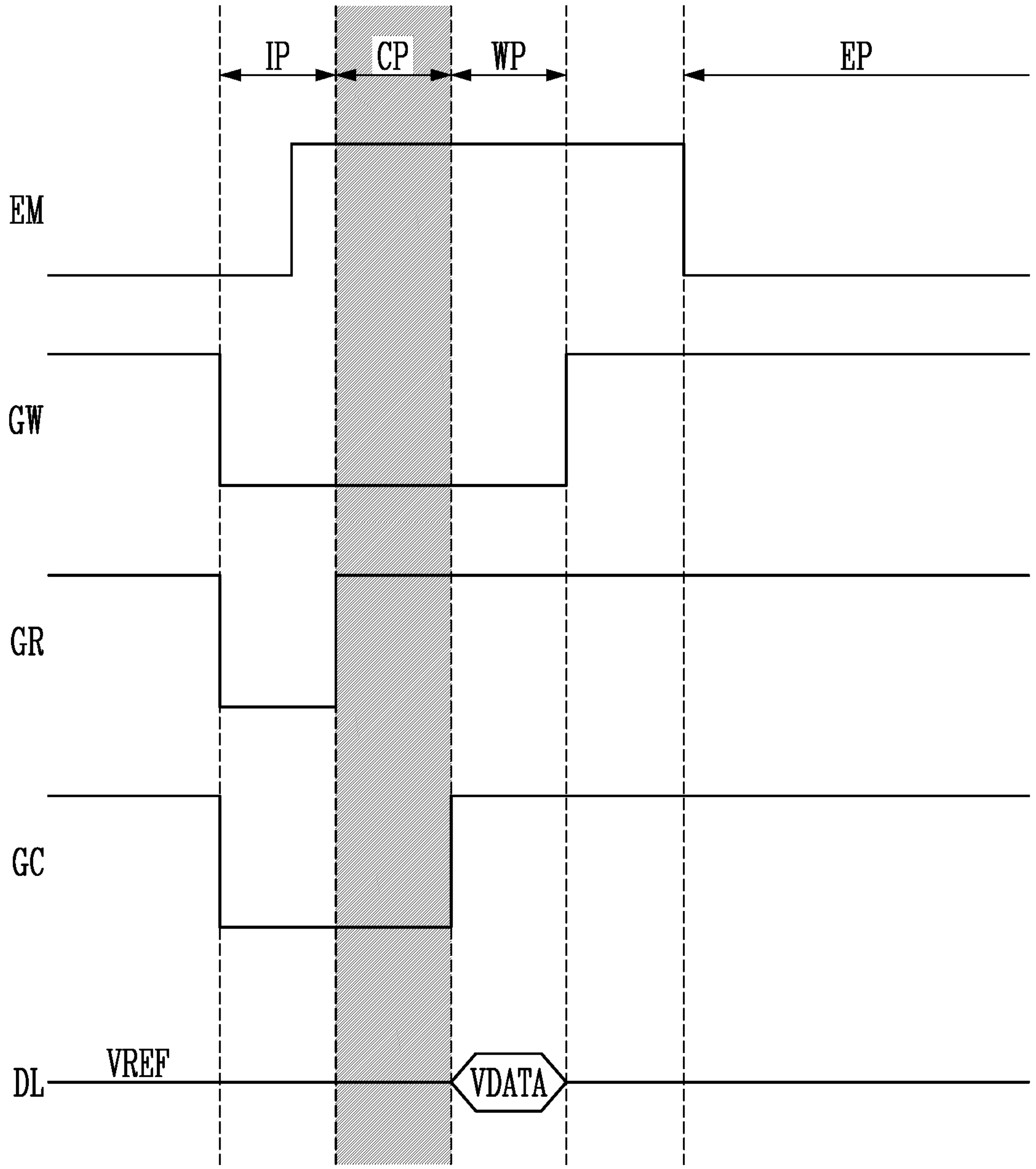

FIGS. 5A and 5B are schematic diagrams illustrating an example in which the sub-pixel SP shown in FIG. 1 may be driven in a compensation period CP. Referring to FIGS. 5A and 5B, the write gate signal GW and the compensation gate signal GC may have an activation period in a compensation period CP and a threshold voltage VTH of the first transistor T1 may be compensated. The initialization gate signal GR and the emission signal EM may have an inactivation period in the compensation period CP. The second transistor T2 may apply the reference voltage VREF to the first electrode of the second capacitor C2 in the compensation period CP. The inactivation period may be a period having the inactivation level where a transistor is turned off.

For example, in the compensation period CP, the write gate signal GW and the compensation gate signal GC may have the activation level, the initialization gate signal GR and the emission signal EM may have the inactivation level, and the second transistor T2 and the third transistor T3 may be turned on. Accordingly, the reference voltage VREF may be applied to the first electrode of the second capacitor C2, and a first power voltage (i.e., ELVDD+VTH) compensated by the threshold voltage VTH may be applied to the first node N1.

Figure 6A:
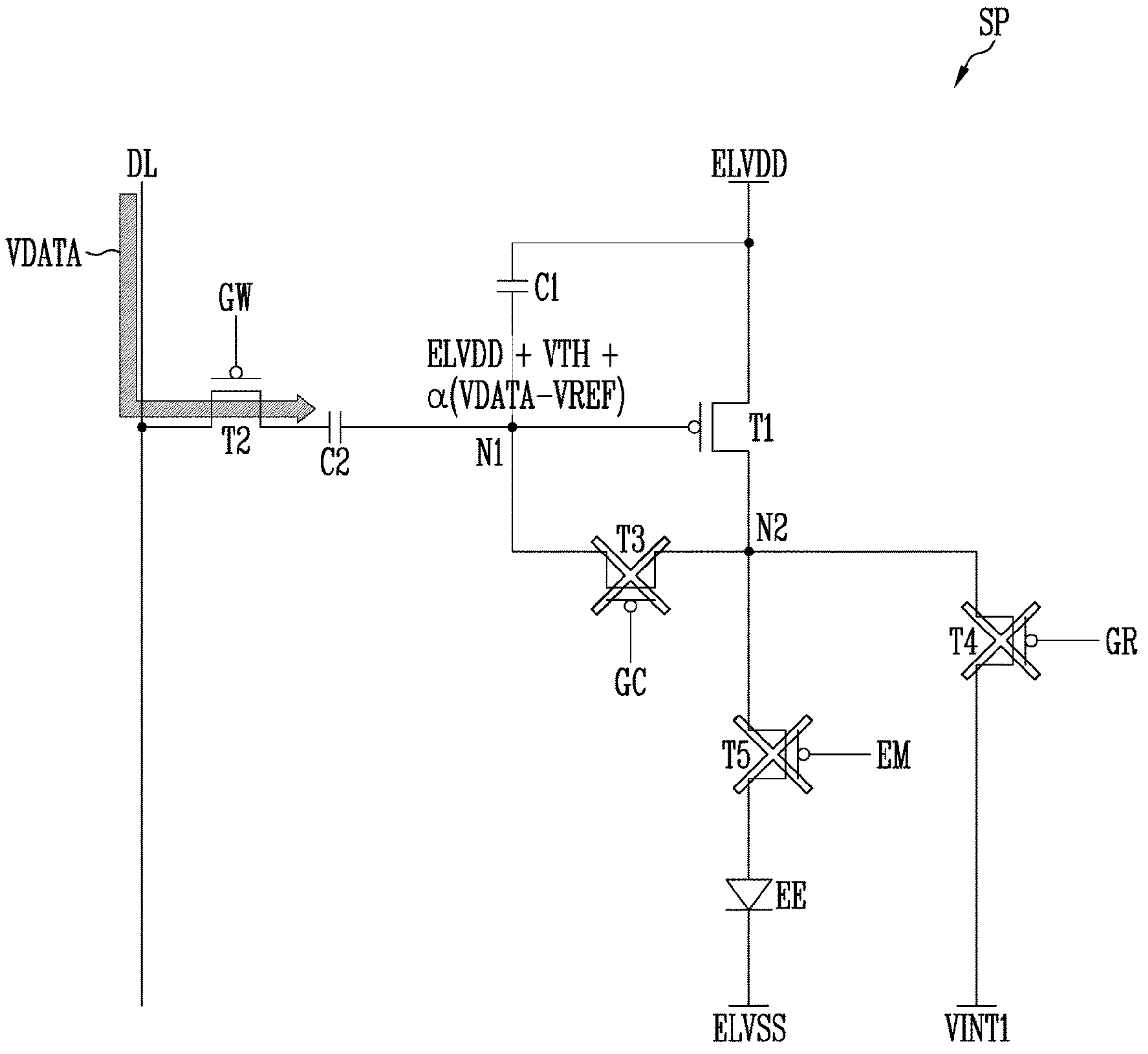
FIGS. 6A and 6B are schematic diagrams illustrating an example in which the sub-pixel shown in FIG. 1 is driven in a data writing period.
Figure 6B:
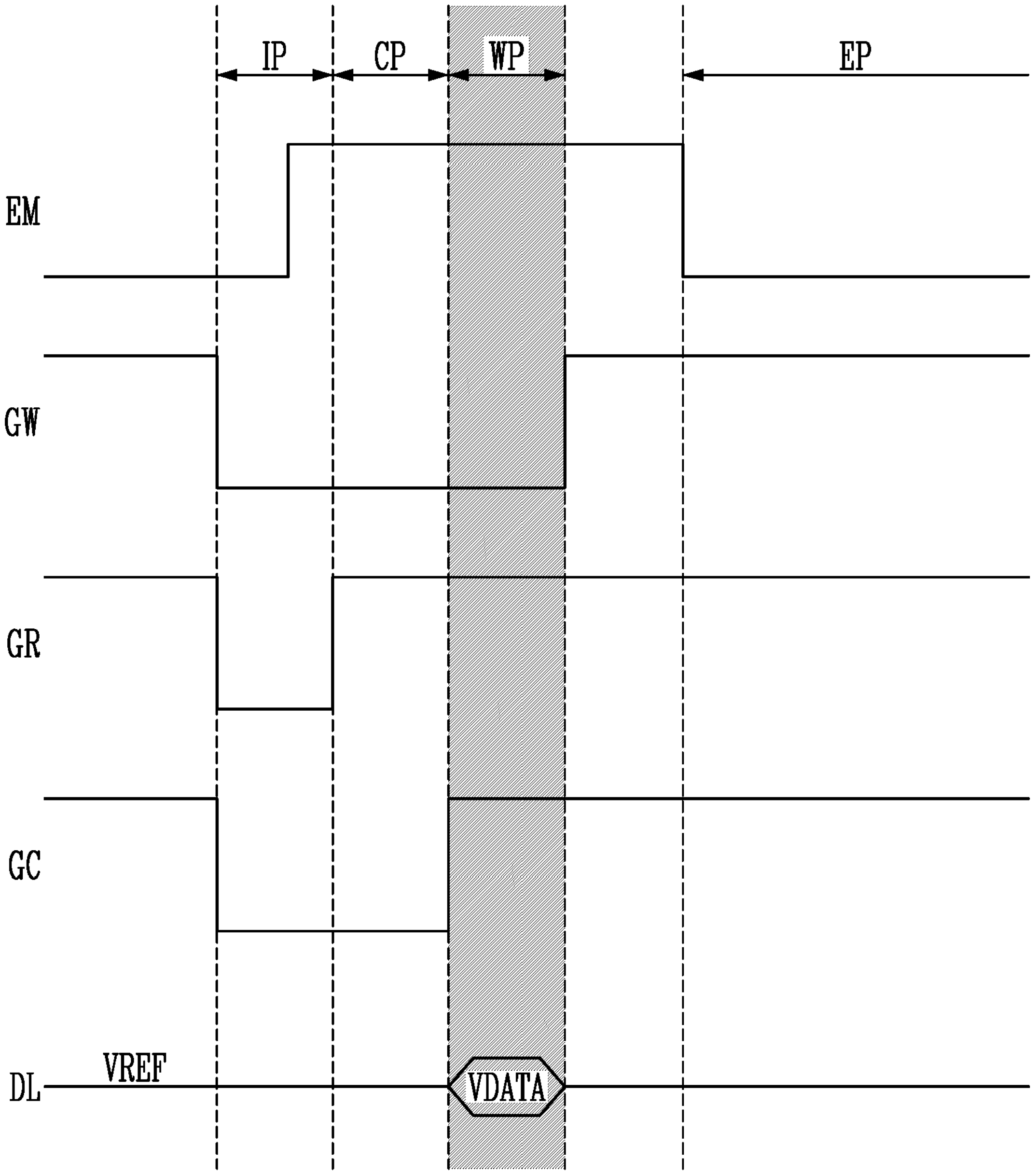

FIGS. 6A and 6B are schematic diagrams illustrating an example in which the sub-pixel SP shown in FIG. 1 may be driven in a data writing period WP. Referring to FIGS. 6A and 6B, the write gate signal GW may have an activation period in a data writing period WP in which a data voltage VDATA may be written. The second transistor T2 may apply the data voltage VDATA to the first electrode of the second capacitor C2 in the data writing period WP. The initialization gate signal GR, the compensation gate signal GC, and the emission signal EM may have the inactivation period in the data writing period WP.

For example, in the data writing period WP, the write gate signal GW may have the activation level, the initialization gate signal GR, the compensation gate signal GC, and the emission signal EM may have the inactivation level, and the second transistor T2 may be turned on. Accordingly, the data voltage VDATA may be applied to the first electrode of the second capacitor C2, and a voltage of the second electrode of the second capacitor C2 (i.e., a voltage of the first node N1) may increase by a voltage (i.e., $\alpha$*(VDATA−VREF)) corresponding to a difference between the data voltage VDATA and the reference voltage VREF. Here, a may be a coefficient varying according to a capacitance of the first capacitor C1 and a capacitance of the second capacitor C2. Thus, the driving range of the first transistor T1 can be adjusted according to a ratio of the capacitance of the first capacitor C1 and the capacitance of the second capacitor C2.

Figure 7A:
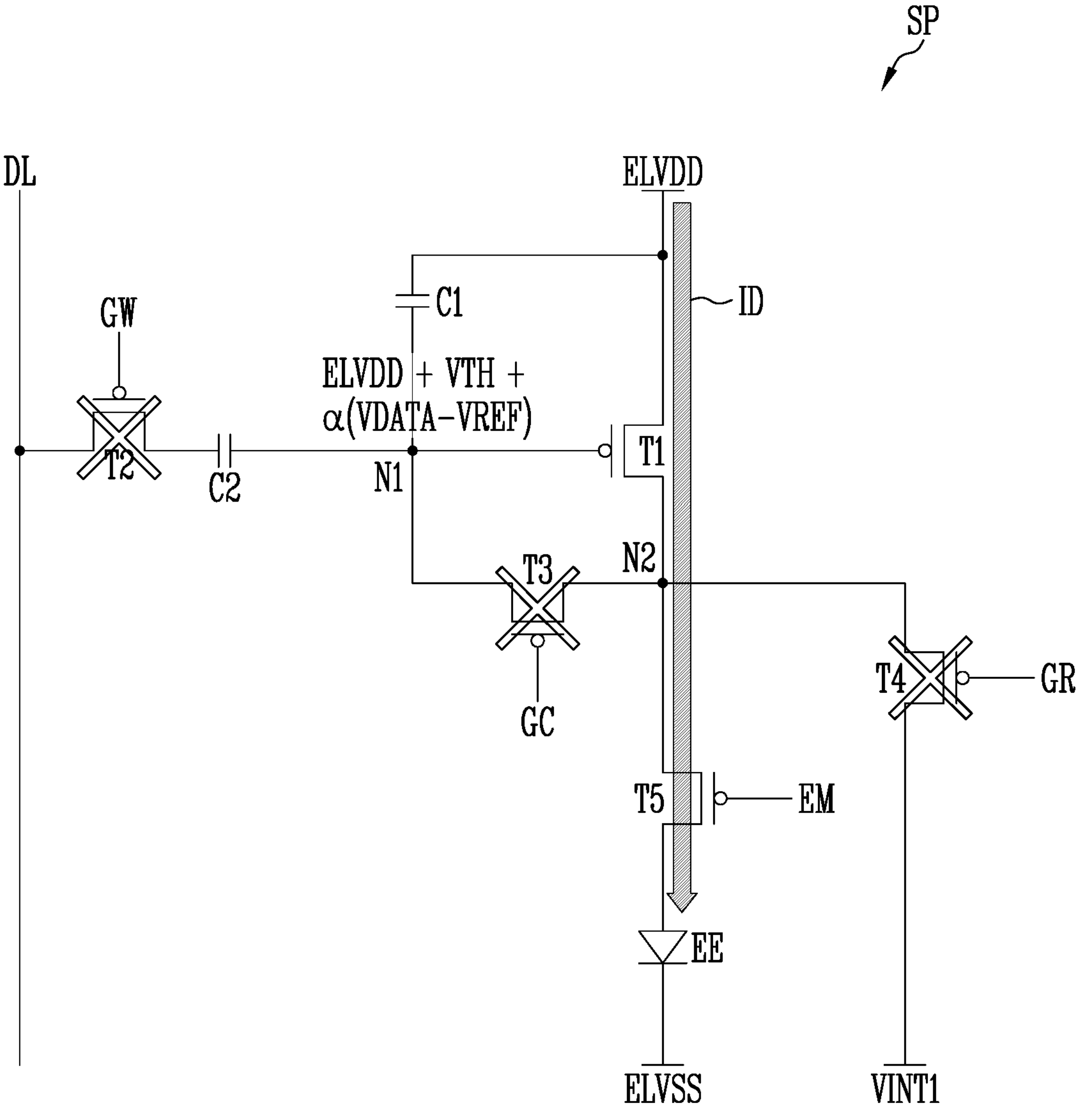
FIGS. 7A and 7B are schematic diagrams illustrating an example in which the sub-pixel shown in FIG. 1 is driven in an emission period.
Figure 7B:
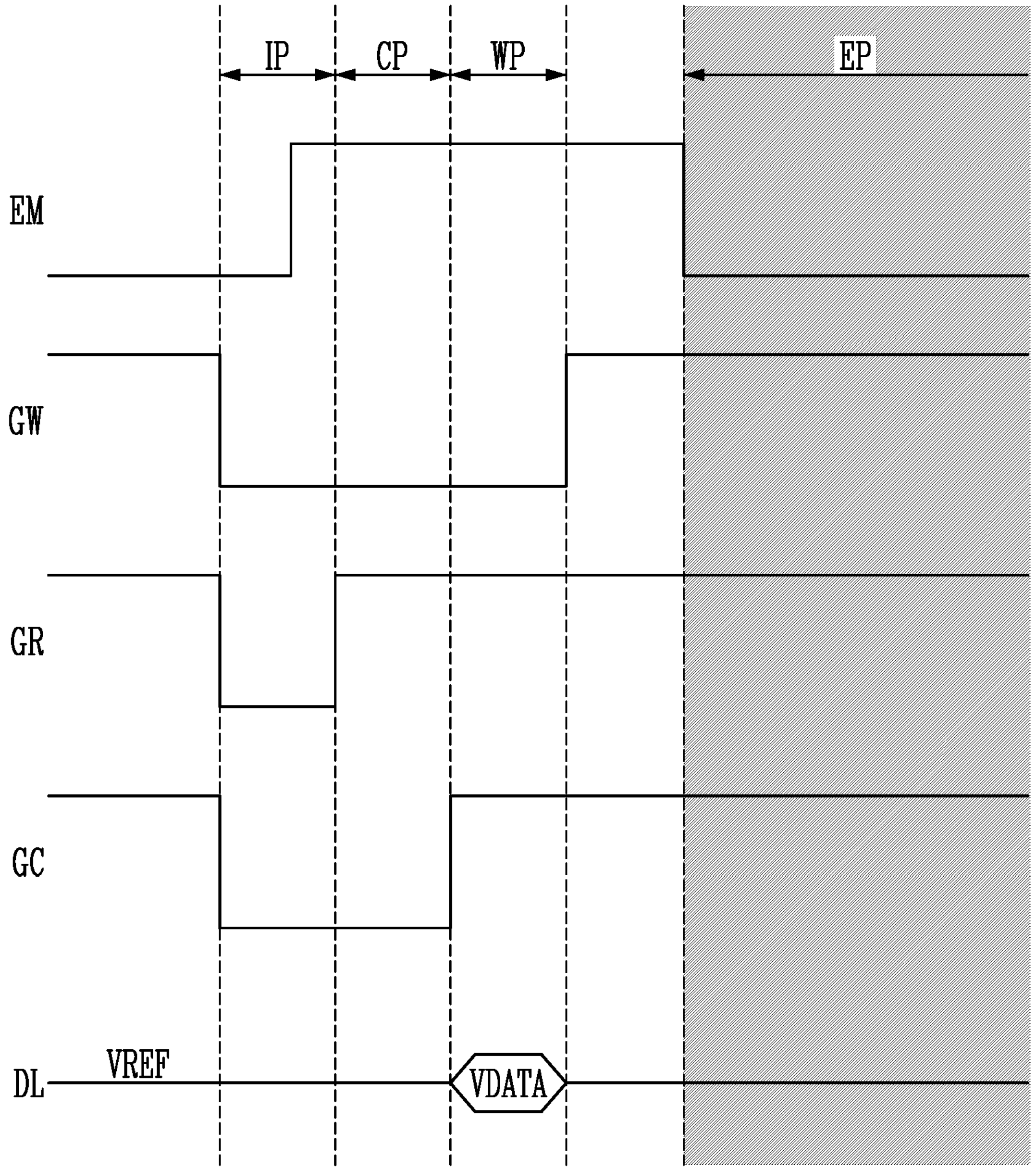

FIGS. 7A and 7B are schematic diagrams illustrating an example in which the sub-pixel SP shown in FIG. 1 may be driven in an emission period EP. Referring to FIGS. 7A and 7B, the emission signal EM may have an activation period in an emission period EP in which the light emitting element EE emits light. The write gate signal GW, the initialization gate signal GR, and the compensation gate signal GC may have the inactivation period in the emission period EP.

For example in the emission period EP, the emission signal EM may have the activation level while the write gate signal GW, the initialization gate signal GR, and the compensation gate signal GC may have the inactivation level, and the fifth transistor T5 may be turned on. Accordingly, a driving current ID corresponding to the voltage of the first node N1 may be generated, and the driving current ID may be applied to the light emitting element EE. For example, the light emitting element EE may emit light with a luminance corresponding to the driving current ID.

Figure 8:
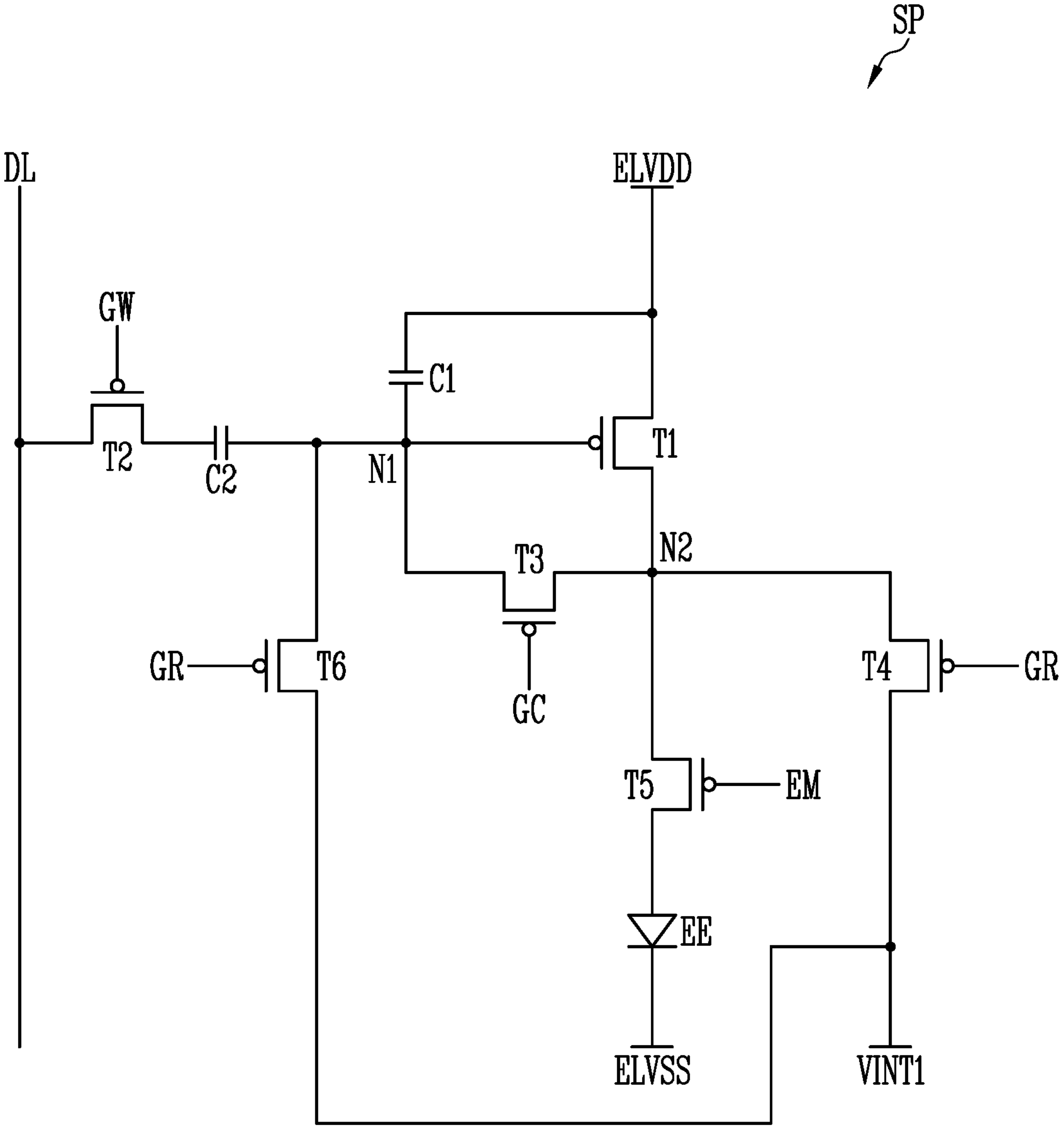
FIG. 8 is a schematic diagram of an equivalent circuit of a sub-pixel of a display device in accordance with embodiments of the disclosure.
Figure 9:
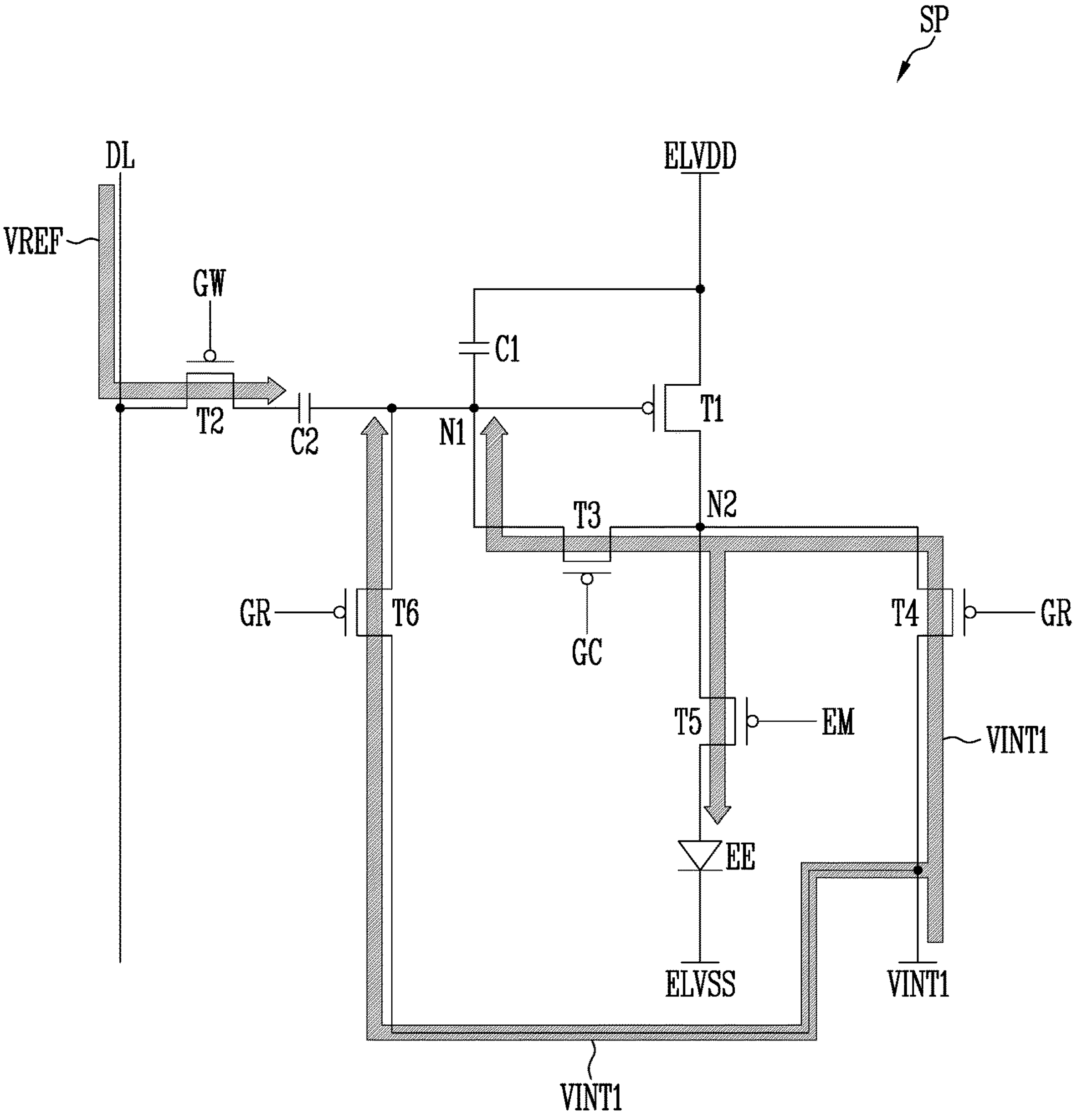
FIG. 9 is a schematic diagram illustrating an example in which the sub-pixel shown in FIG. 8 is driven in an initialization period.

FIG. 8 is a schematic diagram of an equivalent circuit of a sub-pixel SP of a display device in accordance with embodiments of the disclosure, and FIG. 9 is a schematic diagram illustrating an example in which the sub-pixel SP shown in FIG. 8 may be driven in an initialization period IP. The sub-pixel SP in accordance with these embodiments may be configured substantially identical to the sub-pixel SP shown in FIG. 2, except for a sixth transistor T6 and an operation in the initialization period IP. Therefore, components identical or similar to those described above may be designated by like reference numerals, and overlapping descriptions will be omitted.

Referring to FIGS. 3, 8, and 9, the sub-pixel SP may further include a sixth transistor T6 for applying the first initialization voltage VINT1 to the control electrode of the first transistor T1 in response to the initialization gate signal GR. For example, the sixth transistor T6 may include a control electrode receiving the initialization gate signal GR, a first electrode receiving the first initialization voltage VINT1, and a second electrode electrically connected to the control electrode of the first transistor T1. The sixth transistor T6 may be implemented as a PMOS transistor. However, the disclosure may not be limited thereto. For example, the sixth transistor T6 may instead be implemented as an NMOS transistor.

In the initialization period IP, the write gate signal GW, the initialization gate signal GR, the compensation gate signal GC, and the emission signal EM may have the activation level, and the second to sixth transistors T2, T3, T4, T5, and T6 may be turned on. Accordingly, the reference voltage VREF may be applied to the first electrode of the second capacitor C2, and the first initialization voltage VINT1 may be applied to the second electrode of the second capacitor C2, the second electrode of the first capacitor C1, and the first electrode of the light emitting element EE. As a result, the first capacitor C1, the second capacitor C2, and the light emitting element EE may be initialized.

The sub-pixel SP may initialize the first capacitor C1 and the second capacitor C2 through the fourth transistor T4 and the sixth transistor T6. The sub-pixel SP can stably initialize the first capacitor C1 and the second capacitor C2 as compared to a case that the sub-pixel SP initializes the first capacitor C1 and the second capacitor C2 by using only the fourth transistor T4 or the sixth transistor T6.

Figure 10A:
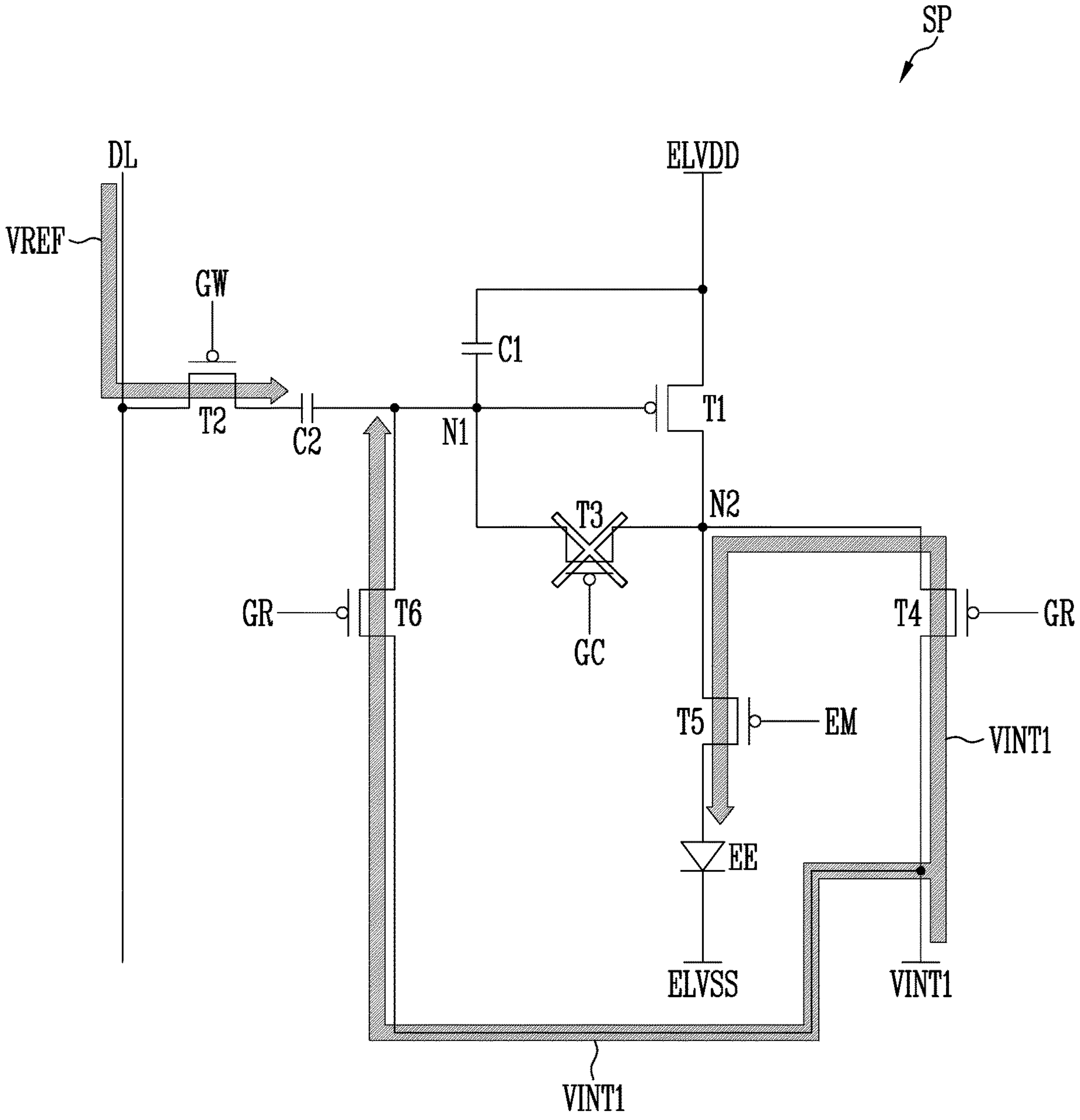
FIGS. 10A and 10B are schematic diagrams illustrating an example in which a sub-pixel of a display device is driven in an initialization period in accordance with embodiments of the disclosure.
Figure 10B:
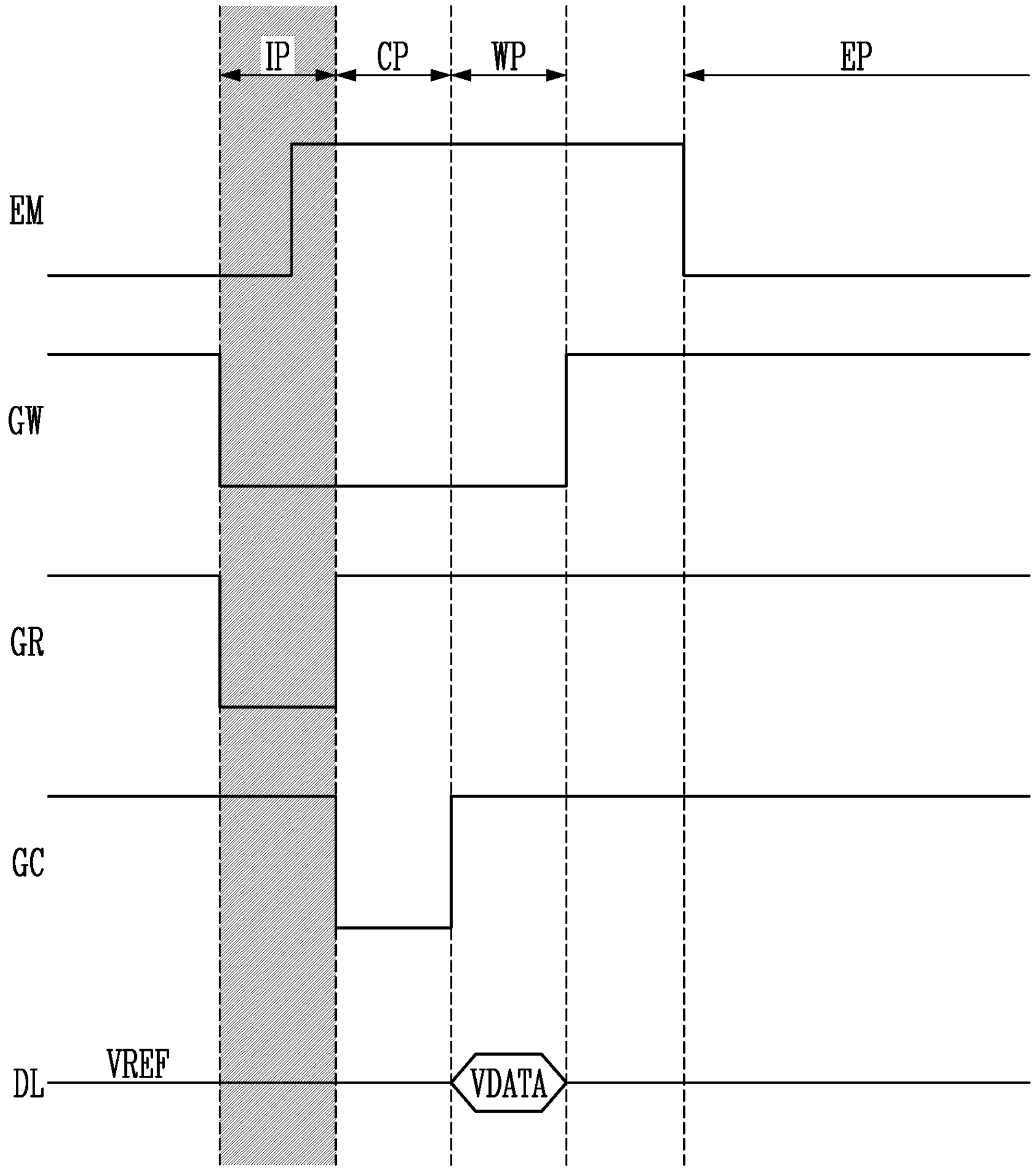

FIGS. 10A and 10B are schematic diagrams illustrating an example in which a sub-pixel SP of a display device may be driven in an initialization period IP in accordance with embodiments of the disclosure. The sub-pixel SP in accordance with these embodiments may be configured substantially identically to the sub-pixel SP shown in FIG. 8, except the compensation gate signal GC may be driven differently. Therefore, components identical or similar to those described above may be designated by like reference numerals, and overlapping descriptions will be omitted.

Referring to FIGS. 10A and 10B, the write gate signal GW, the initialization gate signal GR, and the emission signal EM may have an activation period in the initialization period IP. The compensation gate signal GC may have an inactivation period in the initialization period IP. The second transistor T2 may apply the reference voltage VREF to the first electrode of the second capacitor C2 in the initialization period IP.

For example, in the initialization period IP, the write gate signal GW, the initialization gate signal GR, and the emission signal EM may have the activation level, the compensation gate signal GC may have the inactivation level, and the second, fourth, fifth, and sixth transistors T2, T4, T5, and T6 may be turned on. Accordingly, the reference voltage VREF may be applied to the first electrode of the second capacitor C2, and the first initialization voltage VINT1 may be applied to the second electrode of the second capacitor C2, the second electrode of the first capacitor C1, and the first electrode of the light emitting element EE. As a result, the first capacitor C1, the second capacitor C2, and the light emitting element EE may be initialized.

In case that a voltage charged in the first capacitor C1 in a previous frame may be discharged as the first initialization voltage VINT1 through the third transistor T3, the third transistor T3 may be degraded due to an instantaneous current. Thus, in the display device according to FIGS. 10A and 10B, the third transistor T3 may be turned off in the initialization period IP, so that the degradation of the third transistor T3 can be minimized.

Figure 11:
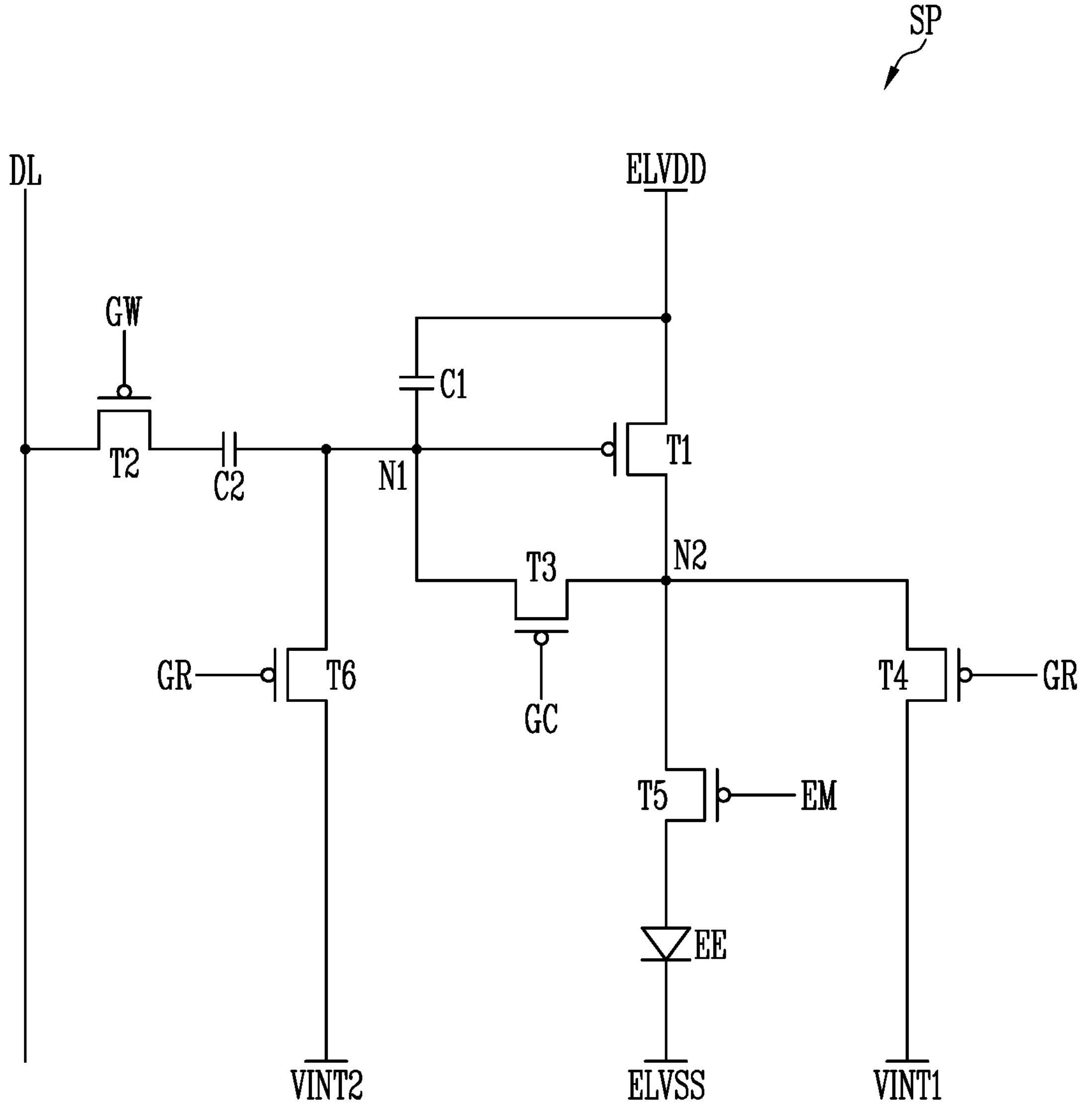
FIG. 11 is a schematic diagram of an equivalent circuit of a sub-pixel of a display device in accordance with embodiments of the disclosure.
Figure 12:
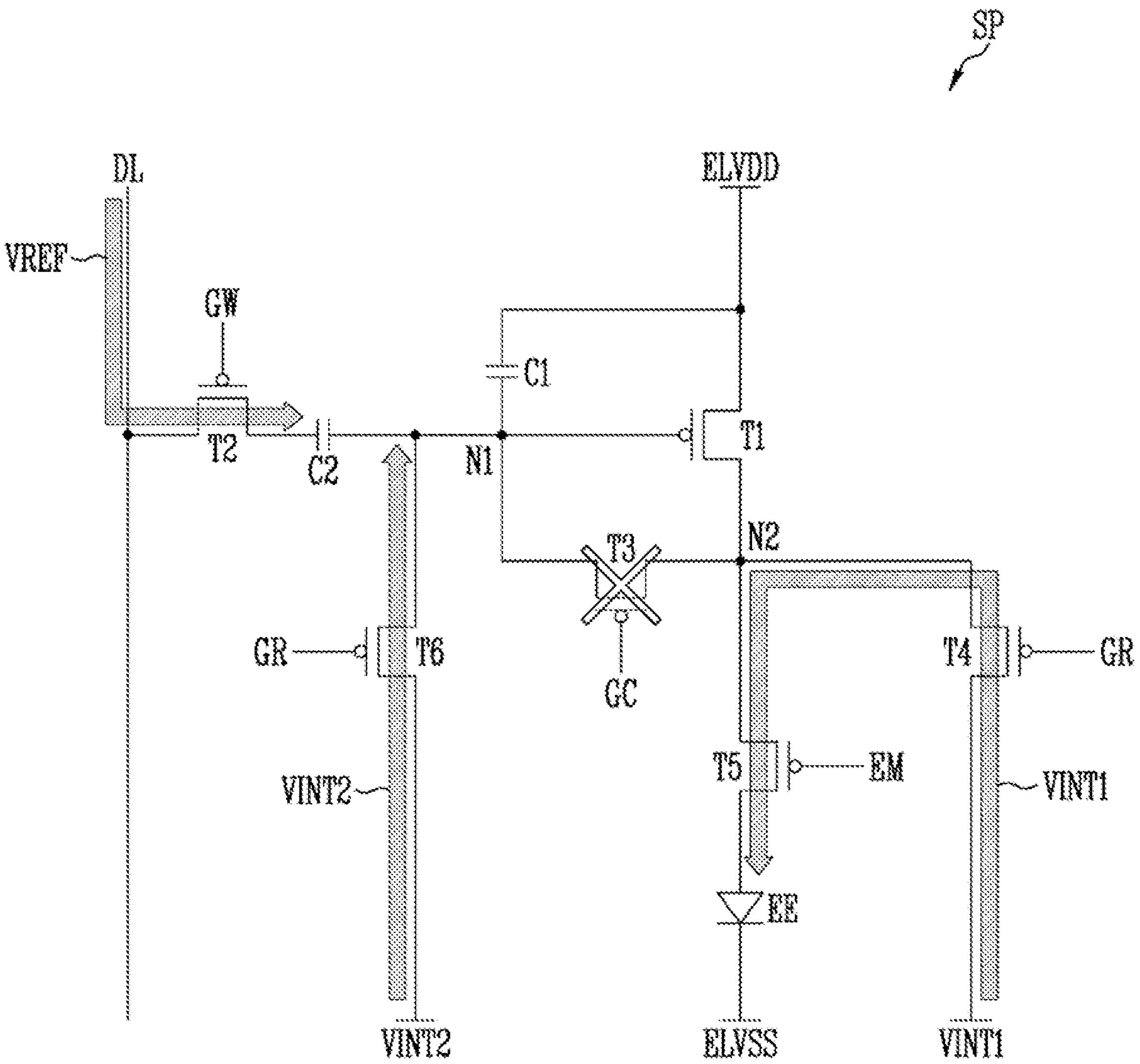
FIG. 12 is a schematic diagram illustrating an example in which the sub-pixel shown in FIG. 11 is driven in an initialization period.

FIG. 11 is a schematic diagram of an equivalent circuit of a sub-pixel SP of a display device in accordance with embodiments of the disclosure, and FIG. 12 is a schematic diagram illustrating an example in which the sub-pixel SP shown in FIG. 11 may be driven in an initialization period IP. The sub-pixel SP in accordance with these embodiments may be configured substantially identically to the sub-pixel SP shown in FIG. 10A, except for the first electrode of the fourth transistor T4 and the first electrode of the sixth transistor T6. Therefore, components identical or similar to those described above may be designated by like reference numerals, and overlapping descriptions will be omitted.

Referring to FIGS. 10B, 11, and 12, the sub-pixel SP may include a fourth transistor T4 for applying the first initialization voltage VINT1 to the first electrode of the third transistor T3 in response to the initialization gate signal GR, and a sixth transistor T6 for applying a second initialization voltage VINT2 to the control electrode of the first transistor T1 in response to the initialization gate signal GR.

For example, the fourth transistor T4 may include a control electrode receiving the initialization gate signal GR, a first electrode receiving the first initialization voltage VINT1, and a second electrode electrically connected to the second node N2. For example, the sixth transistor T6 may include a control electrode receiving the initialization gate signal GR, a first electrode receiving the second initialization voltage VINT2, and a second electrode electrically connected to the control electrode of the first transistor T1. The fourth transistor T4 and the sixth transistor T6 may be implemented with a PMOS transistor. However, the disclosure may not be limited thereto. For example, the fourth transistor T4 and the sixth transistor T6 may instead be implemented with an NMOS transistor.

For example in the initialization period IP, the write gate signal GW, the initialization gate signal GR, and the emission signal EM may have the activation level, the compensation gate signal GC may have the inactivation level, and the second and fourth to sixth transistors T2, T4, T5, and T6 may be turned on. Accordingly, the reference voltage VREF may be applied to the first electrode of the second capacitor C2, the first initialization voltage VINT1 may be applied to the first electrode of the light emitting element EE, and the second initialization voltage VINT2 may be applied to the second electrode of the second capacitor C2 and the second electrode of the first capacitor C1. As a result, the first capacitor C1, the second capacitor C2, and the light emitting element EE may be initialized.

Figure 13:
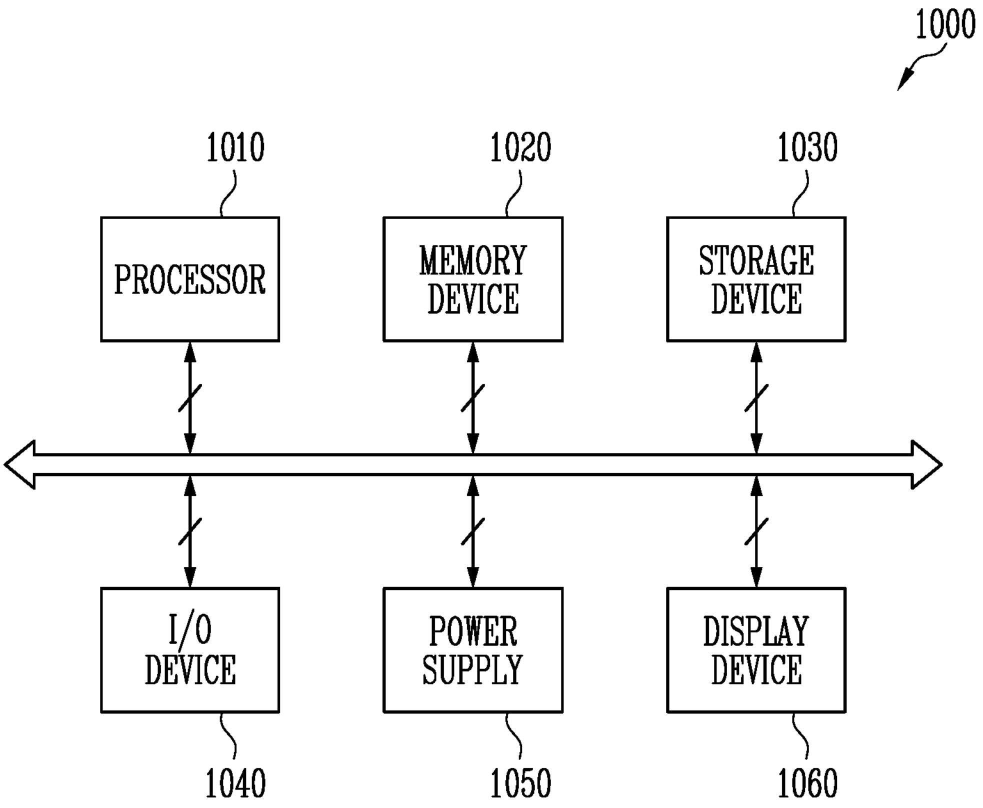
FIG. 13 is a schematic block diagram illustrating an electronic device in accordance with embodiments of the disclosure.
Figure 14:
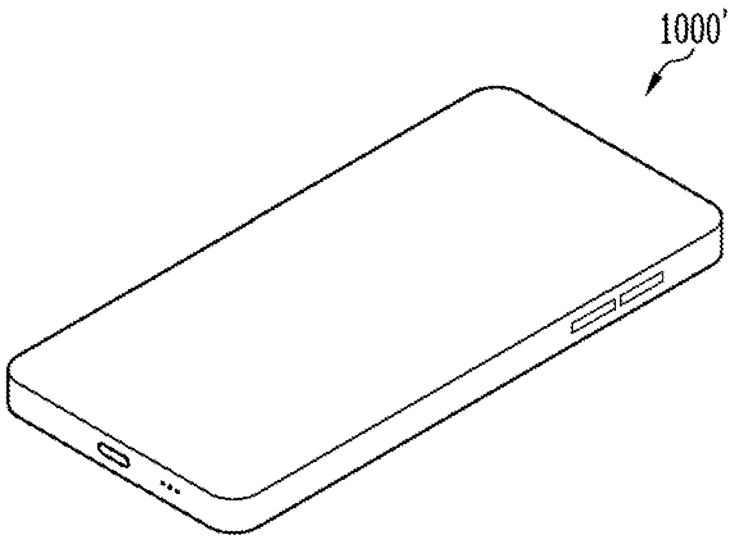
FIG. 14 is a schematic diagram illustrating an example in which the electronic device shown in FIG. 13 is implemented as a smartphone.
Figure 15:
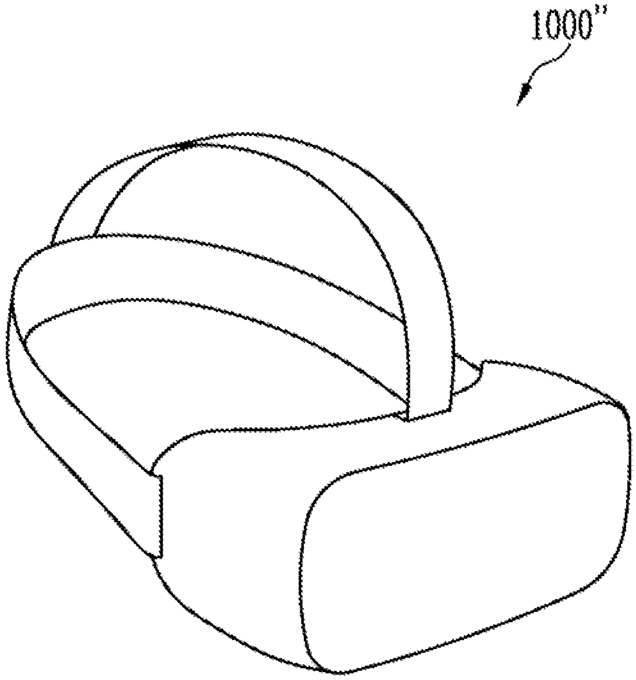
FIG. 15 is a schematic diagram illustrating an example in which the electronic device shown in FIG. 13 is implemented as a virtual reality device.

FIG. 13 is a schematic block diagram illustrating an electronic device 1000 in accordance with embodiments of the disclosure, FIG. 14 is a schematic diagram illustrating an example in which the electronic device shown in FIG. 13 is implemented as a smartphone 1000', and FIG. 15 is a schematic diagram illustrating an example in which the electronic device shown in FIG. 13 may be implemented as a virtual reality device 1000".

Referring to FIGS. 13 to 15, the electronic device 1000 may include a processor 1010, a memory device 1020, a storage device 1030, an input/output (I/O) device 1040, a power supply 1050, and a display device 1060. The display device 1060 may be the display device shown in FIG. 1. Also, the electronic device 1000 may further include ports capable of communicating with a video card, a sound card, a memory card, a USB device, and the like, or communicating with other systems. As shown in FIGS. 14 and 15, the electronic devices 1000 may be implemented as a smartphone 1000' as in FIG. 14 or as a virtual reality device 1000" as in FIG. 15. However, this may be merely illustrative, and the electronic device 1000 may not be limited thereto. For example, the electronic device 1000 may be implemented as a mobile phone, a video phone, a smart pad, a smart watch, a tablet PC, a vehicle navigation system, a computer monitor, a notebook computer, a head mounted display device, or the like.

The processor 1010 may perform specific calculations or tasks. In some embodiments, the processor 1010 may be a microprocessor, a central processing unit, an application processor, or the like. The processor 1010 may be electrically connected to other components through an address bus, a control bus, a data bus, and the like. In some embodiments, the processor 1010 may be electrically connected to an extension bus such as a peripheral component interconnect (PCI) bus.

The memory device 1020 may store data necessary for an operation of the electronic device 1000. For example, the memory device 1020 may include a nonvolatile memory device such as an Erasable Programmable Read-Only Memory (EPROM) device, an Electrically Erasable Programmable Read-Only Memory (EEPROM) device, a flash memory device, a Phase Change Random Access Memory (PRAM) device, a Resistance Random Access Memory (RRAM) device, a Nano Floating Gate Memory (NFGM)

device, a Polymer Random Access Memory (PoRAM) device, a Magnetic Random Access Memory (MRAM) device, or a Ferroelectric Random Access Memory (FRAM) device, and/or a volatile memory device such as a Dynamic Random Access Memory (DRAM) device, a Static Random Access Memory (SRAM) device, or a mobile DRAM device.

The storage device 1030 may include a Solid State Drive (SSD), a Hard Disk Drive (HDD), a CD-ROM, and the like. The I/O device 1040 may include an input means such as a keyboard, a keypad, a touch screen, or a mouse, and an output means such as a speaker or a printer. In some embodiments, the display device 1060 may be included in the I/O device 1040. The power supply 1050 may supply power necessary for an operation of the electronic device 1000. For example, the power supply 1050 may be a power management integrated circuit (PMIC).

The display device 1060 may display an image corresponding to visual information of the electronic device 1000. The display device 1060 may be an organic light emitting display device or a quantum dot light emitting display device, but the disclosure is not limited thereto. The display device 1060 may be electrically connected to other components through the buses or another communication link.

The disclosure can be applied to display devices and electronic devices including the same. For example, the disclosure can be applied to digital TVs, 3D TVs, mobile phones, smart phones, tablet computers, VR devices, PCs, home appliances, notebook computers, PDAs, PMPs, digital cameras, music players, portable game consoles, navigation systems, and the like.

In accordance with the disclosure, the sub-pixel may be implemented with a small number of transistors, thereby achieving small area and high pixels per inch (ppi).

Example embodiments have been disclosed herein, and although specific terms may be employed, they may be used and may be to be interpreted in a generic and descriptive sense only and not for purpose of limitation. In some instances, as would be apparent to one of ordinary skill in the art as of the filing of the application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the disclosure as set forth in the following claims.

What is claimed is:

1. A sub-pixel comprising:

a light emitting element;

a first transistor configured to apply a driving current to the light emitting element, the first transistor comprising a first electrode to receive a first power voltage, a second electrode electrically connected to a second node, and a control electrode electrically connected to a first node;

a second transistor configured to write a data voltage in response to a write gate signal;

a first capacitor electrically connected to the control electrode of the first transistor;

a second capacitor including a first electrode electrically connected to the second transistor and a second electrode electrically connected to the control electrode of the first transistor;

a third transistor to diode-connect the first transistor in response to a compensation gate signal, the third transistor comprising a control electrode to receive the compensation gate signal, a first electrode electrically connected to the second node, and a second electrode electrically connected to the first node;

a fourth transistor configured to apply a first initialization voltage to the first electrode of the third transistor in response to an initialization gate signal, wherein the compensation gate signal and the initialization gate signal are different from each other; and a fifth transistor configured to transfer the driving current to the light emitting element in response to an emission signal.

2. The sub-pixel of claim 1, wherein the first capacitor includes a first electrode receiving the first power voltage and a second electrode electrically connected to the first node, the second transistor includes a control electrode receiving the write gate signal, a first electrode electrically connected to a data line receiving the data voltage, and a second electrode electrically connected to the first electrode of the second capacitor, the fourth transistor includes a control electrode receiving the initialization gate signal, a first electrode receiving the first initialization voltage, and a second electrode electrically connected to the second node, the fifth transistor includes a control electrode receiving the emission signal, a first electrode electrically connected to the second node, and a second electrode electrically connected to a first electrode of the light emitting element, and the light emitting element further includes a second electrode receiving a second power voltage.

3. The sub-pixel of claim 1, wherein the first to fifth transistors are PMOS transistors.

4. The sub-pixel of claim 1, wherein the write gate signal, the initialization gate signal, the compensation gate signal, and the emission signal have an activation period in an initialization period in which the first capacitor, the second capacitor, and the light emitting element are initialized.

5. The sub-pixel of claim 4, wherein after the emission signal is changed from an activation level to an inactivation level in the initialization period, the initialization gate signal is changed from the activation level to the inactivation level.

6. The sub-pixel of claim 1, wherein the write gate signal, the initialization gate signal, and the emission signal have an activation period in an initialization period in which the first capacitor, the second capacitor, and the light emitting element are initialized.

7. The sub-pixel of claim 1, wherein the write gate signal and the compensation gate signal have an activation period in a compensation period in which a threshold voltage of the first transistor is compensated.

8. The sub-pixel of claim 7, wherein the second transistor applies a reference voltage to the first electrode of the second capacitor in the compensation period.

9. The sub-pixel of claim 1, wherein the write gate signal has an activation period in a data writing period in which the data voltage is written.

10. The sub-pixel of claim 1, wherein the emission signal has an activation period in an emission period in which the light emitting element emits light.

11. The sub-pixel of claim 1, further comprising:

a sixth transistor configured to apply the first initialization voltage to the control electrode of the first transistor in response to the initialization gate signal.

12. The sub-pixel of claim 11, wherein the sixth transistor comprises:

a control electrode receiving the initialization gate signal;

a first electrode receiving the first initialization voltage; and a second electrode electrically connected to the control electrode of the first transistor.

13. The sub-pixel of claim 1, further comprising:

a sixth transistor configured to apply a second initialization voltage to the control electrode of the first transistor in response to the initialization gate signal.

14. A sub-pixel comprising:

a light emitting element;

a first transistor configured to apply a driving current to the light emitting element;

a second transistor configured to write a data voltage in response to a write gate signal;

a first capacitor electrically connected to a control electrode of the first transistor;

a second capacitor including a first electrode electrically connected to the second transistor and a second electrode electrically connected to the control electrode of the first transistor;

a third transistor to diode-connect the first transistor in response to a compensation gate signal;

a fourth transistor configured to apply a first initialization voltage to a first electrode of the third transistor in response to an initialization gate signal; and a fifth transistor configured to transfer the driving current to the light emitting element in response to an emission signal, wherein the write gate signal, the initialization gate signal, the compensation gate signal, and the emission signal have an activation period in an initialization period in which the first capacitor, the second capacitor, and the light emitting element are initialized, and the second transistor applies a reference voltage to the first electrode of the second capacitor in the initialization period.

15. A display device comprising:

a display panel including a sub-pixel;

a data driver configured to provide a data voltage to the sub-pixel;

a gate driver configured to provide a write gate signal, a compensation gate signal, and an initialization gate signal to the sub-pixel;

an emission driver configured to provide an emission signal to the sub-pixel; and a driving controller configured to control the data driver, the gate driver, and the emission driver, wherein the sub-pixel includes:

a light emitting element;

a first transistor configured to apply a driving current to the light emitting element. the first transistor comprising a first electrode to receive a first power voltage, a second electrode electrically connected to a second node, and a control electrode electrically connected to a first node;

a second transistor configured to write the data voltage in response to the write gate signal;

a first capacitor electrically connected to the control electrode of the first transistor;

a second capacitor including a first electrode electrically connected to the second transistor and a second electrode electrically connected to the control electrode of the first transistor;

a third transistor to diode-connect the first transistor in response to the compensation gate signal, the third transistor comprising a control electrode to receive the compensation gate signal, a first electrode electrically connected to the second node, and a second electrode electrically connected to the first node;

a fourth transistor configured to apply a first initialization voltage to the first electrode of the third transistor in response to the initialization gate signal, wherein the compensation gate signal and the initialization gate signal are different from each other; and a fifth transistor configured to transfer the driving current to the light emitting element in response to the emission signal.

16. The display device of claim 15, wherein the first capacitor includes a first electrode receiving the first power voltage and a second electrode electrically connected to the first node, the second transistor includes a control electrode receiving the write gate signal, a first electrode electrically connected to a data line receiving the data voltage, and a second electrode electrically connected to the first electrode of the second capacitor, the fourth transistor includes a control electrode receiving the initialization gate signal, a first electrode receiving the first initialization voltage, and a second electrode electrically connected to the second node, the fifth transistor includes a control electrode receiving the emission signal, a first electrode electrically connected to the second node, and a second electrode electrically connected to a first electrode of the light emitting element, and the light emitting element further includes a second electrode receiving a second power voltage.

17. The display device of claim 15, wherein the write gate signal, the initialization gate signal, the compensation gate signal, and the emission signal have an activation period in an initialization period in which the first capacitor, the second capacitor, and the light emitting element are initialized.

18. The display device of claim 17, wherein the second transistor applies a reference voltage to the first electrode of the second capacitor in the initialization period.

19. The display device of claim 17, wherein after the emission signal is changed from an activation level to an inactivation level in the initialization period, the initialization gate signal is changed from the activation level to the inactivation level.

20. The display device of claim 18, wherein the reference voltage is received by the second transistor from a data line.

21. The display device of claim 18, wherein a data line supplies both the data voltage and the reference voltage to the second transistor at different times.

* * * * *